US009378131B2

(12) United States Patent
Kurotsuchi et al.

(10) Patent No.: US 9,378,131 B2
(45) Date of Patent: Jun. 28, 2016

(54) NON-VOLATILE STORAGE ADDRESSING USING MULTIPLE TABLES

(71) Applicant: Hitachi, Ltd., Chiyoda-ku, Tokyo (JP)

(72) Inventors: Kenzo Kurotsuchi, Kodaira (JP); Seiji Miura, Hachioji (JP)

(73) Assignee: Hitachi, Ltd., Tokyo (JP)

(*) Notice: Subject to any disclaimer, the term of this patent is extended or adjusted under 35 U.S.C. 154(b) by 293 days.

(21) Appl. No.: 13/745,292

(22) Filed: Jan. 18, 2013

(65) Prior Publication Data

US 2013/0198439 A1    Aug. 1, 2013

(30) Foreign Application Priority Data

Jan. 26, 2012    (JP) ................................. 2012-013937

(51) Int. Cl.
| G06F 12/00 | (2006.01) |
|---|---|
| G06F 9/26 | (2006.01) |
| G06F 9/34 | (2006.01) |
| G06F 12/02 | (2006.01) |
| G06F 12/10 | (2016.01) |
| G06F 12/08 | (2016.01) |

(52) U.S. Cl.
CPC ........ *G06F 12/0246* (2013.01); *G06F 12/1009* (2013.01); *G06F 12/08* (2013.01); *G06F 12/0802* (2013.01); *G06F 2212/7201* (2013.01)

(58) Field of Classification Search
CPC ................ G06F 12/0246; G06F 2212/7201; G06F 12/08; G06F 12/0802; G06F 12/1009
USPC ......... 711/203, 204, 205, 206, 207, 208, 209, 711/220, 221
See application file for complete search history.

(56) References Cited

U.S. PATENT DOCUMENTS

| 5,900,016 A | 5/1999 | Ghosh |
| 6,377,500 B1 | 4/2002 | Fujimoto et al. |
| 2004/0065744 A1 | 4/2004 | Shiraishi et al. |
| 2005/0144358 A1* | 6/2005 | Conley ............... G06F 12/0246 711/103 |
| 2007/0028034 A1 | 2/2007 | Nishihara |
| 2008/0177937 A1* | 7/2008 | Nishihara ........... G06F 12/0246 711/103 |
| 2009/0193174 A1* | 7/2009 | Reid ................... G06F 12/0246 711/100 |

(Continued)

FOREIGN PATENT DOCUMENTS

| JP | 2002-73409 A | 3/2002 |
| JP | 2004-127185 A | 4/2004 |

(Continued)

OTHER PUBLICATIONS

Y. Sasago et al., "Phase-change memory driven by poly-Si MOS transistor with low cost and high-programming gigabyte-per-second throughput," Symposium on VLSI Technology Digest of Technical Papers, pp. 96-97, 2011.

*Primary Examiner* — Yaima Rigol
*Assistant Examiner* — Shane Woolwine
(74) *Attorney, Agent, or Firm* — Miles & Stockbridge P.C.

(57) ABSTRACT

The non-volatile storage solid state drive (SSD) has non-volatile memory (NVM), random access memory (RAM) capable of being accessed at a higher speed than this NVM, and a control unit for controlling accesses to the NVM and to the RAM. The control unit stores in the NVM an address translation table that translates a logical address given to access this NVM to a physical address after dividing it into multiple tables, and stores in the RAM the multiple address translation tables-sub on RAM that have been divided into multiple tables.

6 Claims, 18 Drawing Sheets

(56) References Cited

U.S. PATENT DOCUMENTS

2010/0115189 A1* 5/2010 Lin et al. .................... 711/103
2010/0153646 A1* 6/2010 Chen et al. .................. 711/122
2010/0332730 A1  12/2010 Royer, Jr. et al.
2011/0093653 A1* 4/2011 Lee et al. .................... 711/103
2011/0153916 A1* 6/2011 Chinnaswamy et al. ..... 711/103
2012/0124318 A1* 5/2012 Bivens et al. ................ 711/170

FOREIGN PATENT DOCUMENTS

JP    2004-199605 A    7/2004
JP    2007-034944 A    2/2007

* cited by examiner

FIG. 2

ADDRESS TRANSLATION TABLE (LPT)

| ADDRESS TRANSLATION TABLE SUB-ON RAM NUMBER | 0 | | | 1 | | | 2 | | |
|---|---|---|---|---|---|---|---|---|---|
| PHYSICAL ADDRESS OF ADDRESS TRANSLATION TABLE SUB-ON RAM | 1021 | | | 2412 | | | 621 | | |
| LOGICAL ADDRESS LPN | 0 | 1 | ... | 1023 | 1024 | 1025 | ... | 2047 | 2048 | 2049 | ... | 3071 |
| PHYSICAL ADDRESS PPN | 904 | 905 | ... | 7 | 1622 | 1623 | ... | 2512 | 1354 | 2213 | ... | 1351 |

FIG. 3

MANAGEMENT INFORMATION OF SSD OF 1-TB CAPACITY

| DATA MANAGEMENT SIZE | 4KB |
|---|---|
| SIZE OF ADDRESS TRANSLATION TABLE | 1TB / 4KB × 4B = 1GB |
| SIZE OF ADDRESS TRANSLATION TABLE-SUB ON RAM | 4KB |
| TOTAL NUMBER OF ADDRESS TRANSLATION TABLES-SUB ON RAM | 1GB / 4KB = 262144 PIECES |
| SIZE OF ERASE TABLE | 1TB / 4KB × 1B = 256MB |
| SIZE OF ERASE TABLE-SUB ON RAM | 4KB |
| TOTAL NUMBER OF ERASE TABLES-SUB ON RAM | 256MB / 4KB = 65536 PIECES |
| SIZE OF AREA TABLE | (262144 + 65536) × 4B = 1208KB |
| SIZE OF ADDRESS TRANSLATION TABLE CACHE | 64MB |
| SIZE OF ERASE TABLE CACHE | 16MB |
| NUMBER OF ADDRESS TRANSLATION TABLES-SUB ON RAM IN ADDRESS TRANSLATION TABLE CACHE | 64MB / 4KB = 16384 PIECES |
| NUMBER OF ERASE TABLE-SUB'S ON RAM IN ERASE TABLE CACHE | 16MB / 4KB = 4096 PIECES |

US 9,378,131 B2

NON-VOLATILE STORAGE ADDRESSING USING MULTIPLE TABLES

CLAIM OF PRIORITY

The present application claims priority from Japanese patent application JP 2012-013937 filed on Jan. 26, 2012, the content of which is hereby incorporated by reference into this application.

FIELD OF THE INVENTION

The present invention relates to a non-volatile storage containing a memory management device. More specifically, the present invention relates to a storage that has a non-volatile storage capable of being written, for example, flash memory or phase change memory, and relates to a technology that is effective in applying to the non-volatile storage containing a memory management device for managing writing or reading.

BACKGROUND OF THE INVENTION

The non-volatile storage having flash memory that is one of non-volatile memories reads and writes data by translating a logical address given in order to access flash memory to a physical address. Then, it has address management information for this address translation.

As a background art of this technical field, there is Japanese Unexamined Patent Application Publication No. 2004-199605 (Patent Document 1). Japanese Unexamined Patent Application Publication No. 2004-199605 describes the following: the address management information of the non-volatile memory is stored in non-volatile memory, and only a necessary part of the address management information is read into volatile memory and used; and when updating an AT (address administration table) that occurs at a time of data update, the next AT is written in a writing area different from that of the current AT.

Moreover, there is Japanese Unexamined Patent Application Publication No. 2002-73409 (Patent Document 2). Japanese Unexamined Patent Application Publication No. 2002-73409 describes the following: part of an address translation table is held in the RAM; and when the address translation information corresponding to a logical address does not exist in the RAM, the part of the address translation table in the RAM is copied to non-volatile memory, and the part of the address translation table corresponding to the logical address in the non-volatile memory is copied.

Moreover, there is Japanese unexamined patent application publication No. 2004-127185 (Patent Document 3). Japanese unexamined patent application publication No. 2004-127185 described the following: a memory card has non-volatile memory capable of being erased and written, e.g., flash memory, buffer memory including DRAM, SRAM, or the like, a card controller for controlling memories and controlling an external interface on a mounting substrate; and the flash memory has an erase table and an address translation table in a part of its memory array. Furthermore, it describes that a storage area (a memory array) of the flash memory is roughly divided into the erase table, the address translation table, a user area, and a free block area that becomes necessary when updating the erase table and the address translation table.

Furthermore, there is U.S. Pat. No. 5,900,016 (Patent Document 4). U.S. Pat. No. 5,900,016 describes a cache control logic using a dirty bit regarding a computer system that contains a microprocessor, cache memory, and main memory.

Moreover, there is 2011 Symposium on VLSI Technology, Digest of Technical Papers, pp. 96-97. 2011 Symposium on VLSI Technology, Digest of Technical Papers, pp. 96-97 describes a semiconductor memory device that has pieces of phase change memory stacked on top of one another. Moreover, it describes that the semiconductor memory device is of a large capacity and can be accessed at high speed.

SUMMARY OF THE INVENTION

However, in the related art including Patent Documents 1 to 4 and Nonpatent Document 1 that were described above, in the case where the DRAM contains an address translation table, sizes of the address translation table and an erase table become large in proportion to increasing capacity of the non-volatile storage. Therefore, large capacity DRAM has become needed and there was a problem that an increase in the number of DRAM chips and an increase in the cost were caused.

Moreover, it has the address translation table and the erase table in the non-volatile memory including flash memory and phase change memory, and when accessing the address translation table for every access from host device, information of the address translation table and the erase table needs to be read and written from/to non-volatile memory whose speed is low as compared with the DRAM. Therefore, there was a problem that the access speed of the non-volatile storage lowered as compared with the case where the non-volatile storage had the address translation table and the erase table in the DRAM.

Then, the present invention is made in order to solve the problem of the related art described above, and its representative object is to reduce a manufacturing cost and to provide a non-volatile storage that has high access performance and reliability and is space saving The above-mentioned and other objects of the present invention and new characteristics will become clear from a description and accompanying drawings of this specification.

An outline of the representative aspect in the invention disclosed in this application will be as follows.

(1) A representative non-volatile storage has first memory of non-volatile type, second memory capable of being accessed faster than the first memory, and a control unit for controlling accesses to the first memory and to the second memory. Then, the control unit stores in the first memory the address translation table for translating a logical address given in order to access the first memory to a physical address with the table being divided into multiple partial address translation tables, and stores in the second memory more than one partial address translation tables of the partial address translation tables that were obtained by dividing the table.

(2) Another representative non-volatile storage has first memory of non-volatile type, second memory capable of being accessed faster than the first memory, and a control unit for controlling accesses to the first memory and to the second memory. Then, the control unit is characterized by storing in the first memory a first table for translating a logical address of data of the first memory to a physical address, storing in the second memory a cache of the first table and a second table for showing where in the first memory the first table is stored, and further storing in the second table multiple addresses of the first table in the first memory.

(3) A still another representative non-volatile storage has first memory of non-volatile type, second memory capable of being accessed faster than the first memory, and a control unit for controlling accesses to the first memory and to the second memory. Then, the control unit is characterized by storing in the first memory the erase table for showing whether the data stored in the first memory is erasable with the table being divided into multiple partial erase tables, and further storing in the second memory more than one partial erase tables of the partial erase tables that were obtained by dividing the table.

Explaining briefly an effect obtained by one representative aspect of the present invention among aspects thereof, it is as follows.

That is, the representative effect is that a non-volatile storage having a reduced manufacturing cost, having high access performance and reliability, and being space saving can be manufactured.

BRIEF DESCRIPTION OF THE DRAWINGS

FIG. 2 is a diagram showing one example of an address, translation table in the non-volatile storage shown in FIG. 1;

FIG. 3 is a diagram showing one example of management information of 1-TB capacity in the non-volatile storage shown in FIG. 1;

DETAILED DESCRIPTION OF THE PREFERRED EMBODIMENTS

Figure 1:
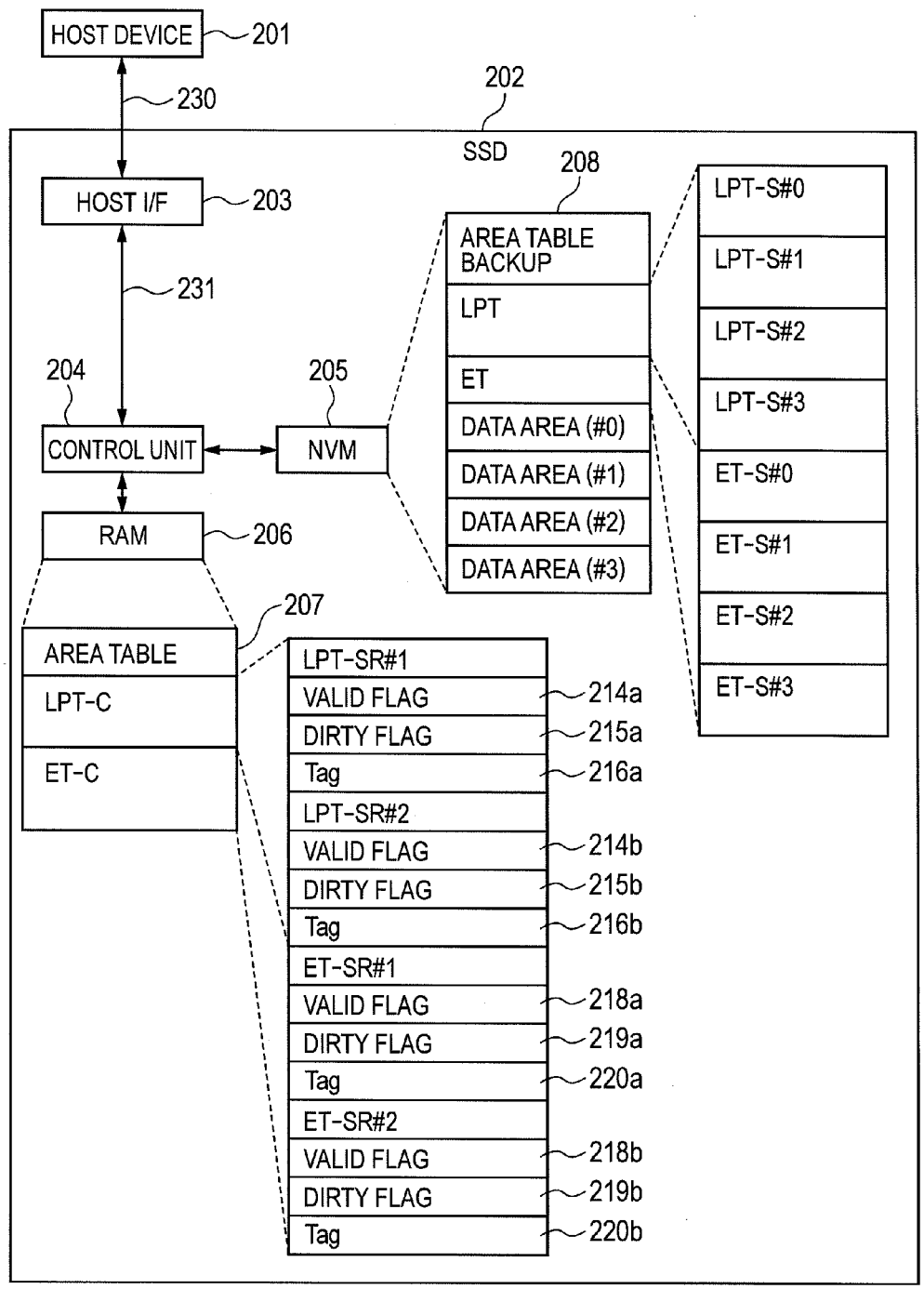
FIG. 1 is a diagram showing one configuration example of a non-volatile storage that is a first embodiment of the present invention.

In the following embodiment, when there is a necessity for convenience, it is divided into multiple embodiments or sections and their explanations are given. However, except for the case where it is shown explicitly in particular, they are not mutually unrelated and one of them may have a relationship with a part or all of the other embodiments, such as a modification, a detail, a supplementary explanation, etc. Moreover, in the following embodiments, when referring to the number of elements etc. (including a count, a numerical value, a quantity, a range, etc.), except for a case where it is shown explicitly in particular, a case where it is theoretically limited to a specific number clearly, and like cases, the number is not limited to that specific number and may be the specific number, or more or less.

Furthermore, in the following embodiments, it goes without saying that the component (including an element step etc.) is not necessarily indispensable except for a case where it is shown explicitly in particular, a case where it is considered to be theoretically indispensable clearly. Similarly, in the following embodiments, when referring to a shape, a spatial relationship, etc. of the component etc., one that is substantially approximate or similar to the shape etc. thereof shall be included except for a case where it is shown explicitly in particular, a case where it is considered to be not so theoretically, etc. The same holds for the above-mentioned numerical value and range.

Outline of Embodiment

An outline of the embodiment will be explained first. In the outline of this embodiment, as one example, the explanation will be given with corresponding components and symbols of each embodiment being put in parentheses.

(1) A representative non-volatile storage (an SSD 202) of the embodiment has first memory of non-volatile type (an NVM 205), second memory (RAM 206) capable of being accessed faster than the first memory, and a control unit (a control unit 204) for controlling accesses to the first memory and to the second memory. Then, the control unit is characterized by storing in the first memory an address translation table (an address translation table LPT) for translating a logical address given in order to access the first memory to a physical address with the table being divided into multiple partial address translation tables, and further storing in the second memory more than one partial address translation tables of the partial address translation tables (address translation tables-sub on RAM (LPT-SRs)) that were obtained by dividing the table.

(2) Another representative non-volatile storage (the SSD 202) of the embodiment has first memory (the NVM 205) of non-volatile type, second memory (RAM 206) capable of being accessed faster than the first memory, and the control unit (the control unit 204) for controlling accesses to the first memory and to the second memory. Then, the control unit is characterized by storing in the first memory the first table (the address translation table LPT) for translating a logical address of data of the first memory to a physical address, storing in the second memory a cache of the first table (the address translation table cache LPT-C) and a second table (an area table 207) for showing where in the first memory the first table is stored, and further storing in the second table multiple addresses, of the first table in the first memory.

(3) A still another representative non-volatile storage (the SSD 202) of the embodiment has first memory (the NVM 205) of non-volatile type, second memory (the RAM 206) capable of being accessed faster than the first memory, and the control unit (the control unit 204) for controlling accesses to the first memory and to the second memory. Then, the control unit is characterized by storing in the first memory an erase table (erase table ET) for showing whether the data stored in the first memory is erasable with the table being divided into multiple partial erase tables, and further storing in the second memory more than one partial erase tables of the partial erase tables (erase tables-sub on RAM (ET-SRs)) that were obtained by dividing the table.

Hereinafter, each of the embodiments based on each of the outlines of the embodiments described above will be explained in detail based on drawings. Incidentally, in all the drawings for explaining the embodiments, as a principle, the same symbol is given to the same component, and repeated explanations thereof will be omitted.

First Embodiment

A non-volatile storage of a first embodiment will be explained using FIG. 1 to FIG. 15.

In this embodiment, an example of the non-volatile storage (SSD: Solid State Drive) will be explained. Below, this non-volatile storage may be described as an SSD. Moreover, non-volatile memory (NVM: Non-Volatile Memory) that forms this non-volatile storage may be described as an NVM. Furthermore, other components may be described by abbreviated names.

<Configuration of Non-Volatile Storage (SSD)>

A configuration of the non-volatile storage (SSD) of this embodiment will be explained using FIG. 1. Together with this, a connection between the SSD and the host device will also be described. FIG. 1 is a diagram showing one example of this configuration of the SSD.

The SSD 202 is comprised of a host interface (I/F) 203, the control unit 204 connected to this host I/F 203 with an interface 230, the NVM 205 connected to this control unit 204, and RAM 206 connected to this control unit 204.

This SSD 202 is connected with a host device 201 using the interface 230. As the interface 230, a SATA (Serial Advanced Technology Attachment), a PCI express, an FC-AL (Fibre Channel Arbitrated Loop), and a SAS (Serial Attached SCSI) can be used. Moreover, in the case where the host device 201 is a tablet computer or a smart phone, an internal bus of parallel connection mounted on a printed circuit board can also be used. It goes without saying that as an interface signal, an optical signal can be used in addition to an electric signal.

The host I/F 203 can contain a PHY (physical layer). Particularly, in the case where the interface 230 is a serial connection, it is desirable that the host I/F 203 controls clock generation of a serial-parallel converter and serial transfer, and communication control of the interface 230.

The host I/F 203 and the control unit 204 are connectable with each other by an internal bus 231. Preferably, this internal bus 231 is a parallel connection with a small latency.

It is advisable that the control unit 204 should have a data write buffer, add ECC (Error Correcting Code) to data at the time of writing the data, and perform inspection and correction on the ECC at the time of reading the data. Moreover, it is advisable that addition, inspection, and correction of the ECC should be performed also in the address translation table LPT and the erase table ET on the NVM 205. Furthermore, by performing addition, inspection, and correction of the ECC also in an address translation table cache LPT-C and an erase table cache ET-C on the RAM (e.g., DRAM) 206, the high-reliability. SSD 202 can also be provided. Such a high-reliability SSD 202 can be used, especially, as a recording device of a server. The control unit 204 indicates an SSD controller.

The control unit 204 is a controller that performs a control to an access request sent from the host device 201 using data stored in the SRAM, the RAM 206, and the NVM 205 in the control unit 204, and returns a response according to a result of the control to the host device 201.

The RAM 206 stores the area table 207, the address translation table cache LPT-C (Logical Physical translation Table-Cache), and the erase table cache ET-C (Erase Table-Cache). Incidentally, it goes without saying that it is possible to set up block management information in addition to these.

Furthermore, the address translation table cache LPT-C has multiple address translation tables-sub on RAM (LPT-SRs) (Logical Physical Tables-Sub on RAM) (LPT-SR#1, LPT-SR#2). Every address translation table-sub on RAM (LPT-SR) has valid flags 214 (214*a*, 214*b*), dirty flags 215 (215*a*, 215*b*), and tags 216 (216*a*, 216*b*).

Moreover, the erase table cache ET-C has multiple erase tables-sub on RAM (ET-SRs) (Erase Tables-Sub on RAM) (ET-SR#1, ET-SR#2). Each erase table-sub on RAM (ET-SR) has valid flags 218 (218*a*, 218*b*), dirty flags 219 (219*a*, 219*b*), and tags 220 (220*a*, 220*b*).

Furthermore, the valid flag, the dirty flag, and the tag can be used for management of the cache. A concrete control is performed as follows. For example, in the state where the address translation table-sub on RAM (LPT-SR) has not been copied to the address translation table cache LPT-C yet, all the valid flags are "false." When one of the address translation tables-sub on RAM (LPT-SRs) is copied to the address translation table cache LPT-C, the valid flag of the address translation table-sub on RAM (LPT-SR) part is set "true." Moreover, the dirty flag is set "false." In addition, at least one part (e.g., upper 24 bits in 32 bits of an address, an entry address) of the logical address is saved as a tag.

An address determination is performed as follows: first, a search range (entries) of the address translation table cache LPT-C that should be searched is limited by using at least a part of the logical address (e.g., lower eight bits in 32 bits of the address); next, the address translation table-sub on RAM (LPT-SR) is searched by putting the tag into comparison; and a determination of a cache hit is performed.

Although the write back system was taken as a data update system of the cache and the set associative system was taken as a data storing structure for the example, it goes without saying that other cache control systems can be used.

The same control as that of the address translation table cache LPT-C can also be performed on the erase table cache ET-C. Incidentally, since the data size of the erase table is small as compared with the data size of the address translation table, a cache control can be performed only on the address translation table. In that case, since the control of the erase table becomes simple, a configuration of the SSD controller becomes simple, which can reduce its development time and development cost.

When information of the address translation table-sub on RAM (LPT-S) in the NVM 205 and information of the address translation table-sub on RAM (LPT-SR) in the RAM 206 come to disagree with each other by address rewriting, a dirty flag for the address translation table-sub on RAM (LPT-SR) is set "true." Furthermore, when the address translation table-sub on RAM (LPT-SR) in the address translation table cache LPT-C is erased, if the dirty flag for the address translation table-sub on RAM (LPT-SR) is "false," it will be erased simply, and if it is "true," it will be written back to the NVM 205. Incidentally, the physical address of a write-back destination does not necessarily need to agree with the physical address of a copy source.

Next, the NVM 205 has an area table backup 208, the address translation table LPT (Logical Physical translation Table), the erase table ET (Erase Table), and data areas (#0 to #3). The address translation table LPT is comprised of multiple address translation tables-sub on RAM (LPT-Ss) (Logical Physical Tables-Sub) (LPT-S#0 to LPT-S#3). Moreover, the erase table ET is comprised of multiple erase tables-sub on RAM (ET-Ss) (Erase Tables-Sub) (ET-S#0 to ET-S#3).

Incidentally, in the case of using volatile memory or memory whose reliability is inferior to the NVM 205 as the RAM 206, a content of the area table is backed up in the area table backup 208. When the power supply of SSD 202 is interrupted, the backup is performed. Moreover, the backup can also be performed when a fixed quantity of write accesses are performed on the area table. Especially, when there is no write instruction from the host device 201 to the SSD 202 for a fixed time, the backup can be performed. If a backup frequency is raised, since information loss of the area table will become hard to occur, reliability of the SSD 202 will improve, but increases in a data write size to the NVM 205 and a writing time accompanying the writing will lower performance of the SSD 202.

<Configuration of Address Translation Table>

A structure of the address translation table LPT described above will be explained using FIG. 2. FIG. 2 is a diagram showing one example of this address translation table LPT.

The address translation table LPT is a table for translating the logical address specified when being required from the host device 201 to a physical address of the NVM 205. The address translation table LPT is managed being divided into multiple address translation tables-sub on RAM (LPT-Ss).

A physical address of the address translation table-sub on RAM (LPT-S) in the NVM 205 is managed by the area table. That is, the area table is a table for translating the logical address LPN to the physical address PPN of the address translation table-sub on RAM (LPT-S).

It is desirable that the logical addresses are consecutive in the address translation table-sub on RAM (LPT-S) in order to simplify table management. If the management method is simple, it will bring effects that design mistakes (bugs) of the circuit and the software will be reduced, and that the SSD 202 operating with high reliability will be able to be provided in a short time.

Here, the explanation will be given setting the physical page size that is a minimum writing unit of the NVM 205 to 4 KB and setting a size of the address translation table-sub on RAM (LPT-S) to 4 KB. The data size of the address translation table-sub on RAM (LPT-S) can be set to the physical page size multiplied by the number of planes of the NVM 205, or what is obtained by the following Formula (1).

Physical page size of NVM×number of planes of NVM×number of ch's of NVM (1)

Since it becomes possible to simultaneously operate all the ch's (channels) of the NVM by a simple control method using data size obtained by the above-mentioned Formula (1), the high-performance SSD 202 can be manufactured in a short time.

The data size of one physical address PPN of the NVM 205 was set to 4 B. A data management size in the SSD 202 was set to 4 KB. It is advisable that the actual data management size is determined according to an OS (operating system) of the host device 201 and to how it is used (required reliability and performance, and a data pattern required from the host device 201). In some case, a data management unit of the OS can be 4 KB. For example, in the case of Windows VISTA (registered trademark), a default cluster size (a minimum unit of the disk area that can be allocated to a file in order to maintain it) in the NTFS (NT File System) is 4 KB when the volume size is 7 MB to 16 TB.

For example, when the host device 201 issues a data rewrite request of data of 4 KB in size, if the data management size is 4 KB, the data sent from the host device 201 should just be written in the NVM 205; therefore, the data write size to the NVM 205 will be 4 KB. On the other hand, if the data management size is 32 KB, first, data of 28 KB in size will be read from the NVM 205, and will be made into data of 32 KB by addition with the data of 4 KB sent from the host device 201, and will be written in the NVM 205. Comparing this with a case of a data management size of 4 KB, the data write size becomes eightfold.

As shown in the above, when the data management size is enlarged, a smaller amount of management information of the SSD 202 is required, but transfer performance and a lifetime of the SSD 202 may decline. As the management information of the SSD 202, there are the address translation table LPT, the erase table ET, the management information for every block, and information necessary to control the SSD controller (e.g., a page number of the NVM 205 in which the writing is performed next, a minimum number of the number of erasures in all the blocks, etc.).

Since the size of the address translation table-sub on RAM (LPT-S) is 4 KB and the size of the physical address PPN is 4 B, a single address translation table-sub on RAM (LPT-S) is capable of translating 1024 logical addresses to the physical addresses. For example, the address translation table-sub on RAM (LPT-S) with number 0 can have 1024 pieces of correspondence of the logical address LPN and the physical address PPN. Moreover, the same holds for the address translation tables-sub on RAM (LPT-Ss) with number 1 and number 2.

The address translation table-sub on RAM (LPT-S) with number zero has information of 1024 physical addresses PPNs corresponding to the logical addresses LPN0 to LPN1023. Moreover, the address translation table-sub on RAM (LPT-S) with number 1 has information of 1024 physical addresses PPNs corresponding to the logical addresses LPN1024 to LPN2047, and the address translation table-sub on RAM (LPT-S) with number 2 does 1024 physical addresses PPNs corresponding to the logical addresses LPN2048 to LPN3071.

Incidentally, the host device 201 can specify an address and a size of data by LBA (Logical Block Addressing) in units of 512 B. The logical address LPN can be found by multiplying a value of the LBA by 512 B and further dividing this product by the data management size.

As shown in FIG. 2, the logical addresses LPNs contained in consecutive translation table-sub on RAM number may be made consecutive. It is desirable that the address translation table-sub on RAM contains multiple pieces of correspondence of the logical address and the physical table. Moreover, the wear leveling can be performed in units of the address translation tables-sub on RAM. The data size of the address translation table-sub on RAM and the data management size in the SSD 202 can be equalized. By doing in this way, the data and the management information of the SSD 202 can be handled similarly, and therefore the high-reliability SSD 202 can be provided in a short time.

The logical address LPN0 shown in FIG. 2 corresponds to an address space of 4 KB in size of the logical address space of 0 to 3 KB, the logical address LPN1 corresponds to an address space of 4 KB in size of the logical address space of 4 to 7 KB, similarly hereafter, and each logical address LPN corresponds to an address space of 4 KB in size, respectively.

<Management Information of Non-Volatile Storage>

The management information of the SSD 202 described above will be explained using FIG. 3. FIG. 3 is a diagram showing one example of the management information of 1-TB capacity. That is, the capacity (capacity that can be accessed from the host device 201) of the SSD 202 is set to 1 TB. A capacity required for the NVM 205 is a capacity obtained by adding the management information and an auxiliary area to the capacity of the SSD 202.

If the data management size is set to 4 KB suitable for Windows OS (registered trademark) etc., a size of the address translation table LPT will be 1 GB. Incidentally, the data size required for one piece of correspondence of the logical address LPN to the physical address PPN is set to 4 B. The address space in units of 4 KB such that each address is expressed by 4 B, namely 32 bits, becomes 16 TB, as expressed by the following Formula (2).

$$4 \text{ KB} \times 2^{32} = 16 \text{ TB} \quad (2)$$

The data size of the address translation table-sub on RAM (LPT-S) shall be 4 KB. It is advisable that this data size shall be a data size that facilitates efficient writing in the NVM 205. For example, it is advisable for the data size to have a value obtained by multiplying the page size of the NVM 205 or the above-mentioned page size by the number of planes of the NVM 205, or a value obtained by multiplying that value by the number of channels of the NVM 205. In this case, a total number of the address translation tables-sub on RAM (LPT-Ss) will be 262144. Similarly, it can be determined that a size of the erase table ET is 256 MB, a size of the erase table-sub on RAM (ET-S) is 4 KB, a total number of the erase tables-sub on RAM (ET-Ss) is 65536. Erase information for every data management size can be expressed by 1 B (byte). It can be determined to store only valid/invalid information, which can also be expressed by one bit. In this case, since the size of the erase table ET can be made small, there is a merit that a capacity of the NVM 205 can be made small.

The data size of the area table can be set to 1280 KB. The area table stores the physical addresses of the address translation table-sub on RAM (LPT-S) and the erase table-sub on RAM (ET-S). Since the physical addresses in the address translation table-sub on RAM (LPT-S) are consecutive, it should store only a first physical address.

The area table will be explained further. The area table stores the physical addresses of the address translation table-sub on RAM (LPT-S) and the physical addresses of the erase table-sub on RAM (ET-S). If the area table is used, the physical address of the address translation table-sub on RAM (LPT-S) corresponding to an arbitrary logical address can be found. Moreover, a physical address of the erase table-sub on RAM (ET-S) corresponding to an arbitrary physical address can also be found.

Data sizes of the address translation table cache LPT-C and the erase table cache ET-C can be set to 64 MB and 16 MB, respectively. At this time, the numbers of the address translation tables-sub on RAM (LPT-SRs) and the erase tables-sub on RAM (ET-SRs) become 16384 and 4096, respectively. It goes without saying that it is possible to vary a cache size according to the OS and an application that are targeted.

The method for translating the logical address LPN to the physical address PPN will be explained using a specific example.

Suppose that, for example, a read request of data of "8" in size at a start address "2982648" was sent to the SSD 202 from the host device 201. An addressing method that the host device 201 uses is assumed as the LBA that performs addressing in units of 512 B.

The control unit 204, namely the SSD controller, can obtain the start address and the data size in LPN notation by the method described above. That is, it can obtain the start address and the data size that were translated to the LPN by the following Formula (3) and Formula (4).

$$\text{Start address (LPN)} = 2982648 \times 512 \text{ B}/4 \text{ KB} = 372831 \quad (3)$$

$$\text{Data size (LPN)} = 8 \times 512 \text{ B}/4 \text{ KB} = 1 \quad (4)$$

Next, a number of the address translation table-sub on RAM to refer to is determined. Since the number of pieces of correspondence of the logical address to the physical address that a single address translation table-sub on RAM manages is a value obtained by dividing the size 4 KB of the address translation table-sub on RAM by the size of one physical address, namely 4 B, it will be 1024. Therefore, it is understood from the following Formula (5) described below that a number of the address translation table-sub on RAM that should be referred to is "364." Incidentally, figures below the decimal point are rounded down.

$$\text{Number of address translation table-sub on RAM} = 372831/1024 = 364 \quad (5)$$

Next, an entry of the address translation table-sub on RAM is calculated. If "364" is expressed in binary digits, it is "101101100" and this lower 6 bits is "101100." If this is expressed in decimal form, it is "44." That is, it is understood that the address translation table-sub on RAM #364 belongs to an entry 44. Incidentally, its tag can be calculated using the upper 26 bits. It is understood that the tag of the address translation table-sub on RAM#364 is "5."

Then, the entry 44 of the address translation table cache LPT-C in the RAM 206 is retrieved. There exist 256 address translation tables-sub on RAM (LPT-SRs) in each entry, as described above. The tag exists for every LPT-SR. The tags of 256 LPT-SRs at a maximum are checked to check whether there is a tag that coincides with the entry 44. If there is a tag that achieves coincidence, then the valid flag will be checked further, and if it is an effective cache, a determination that the cache hit occurs will be made.

First, the case where the cache hit occurs will be described. In this case, the data that should be read, namely the physical address of the logical address LPN "372831" is found using the address translation table-sub on RAM that was searched. Specifically, the logical address LPN "372831" is divided by the number of pieces of correspondence "1024" of the logical address to the physical address in the address translation table-sub on RAM (LPT-SR) described above to find out a residual. In this case, the surplus becomes "95." That is, if data of 4 B in size is read from an address obtained by offsetting the start address in the RAM 206 of the searched address translation table-sub on RAM (LPT-SR) by 380 B that is a value "95" multiplied by a magnitude of one physical address, namely 4 B, the physical address of the logical address LPN "372831" will be obtained.

This physical address contains a number of the chip in which the data is stored, a block number, a page number, and a plane number, and the data requested from the host device 201 can be read by accessing an address of the NVM 205 that this physical address points.

Next, the case where a cache miss occurs will be described. When the cache miss occurs, an update processing of the address translation table cache LPT-C that will be described later (FIG. 7) is performed, and the part of the address translation table-sub on RAM (LPT-S) is copied to the RAM 206 from the address translation table LPT. Specifically, the area table 207 is read and the physical address of the address translation table-sub on RAM (LPT-S) is found. Next, the address translation table-sub on RAM (LPT-S) is copied to the RAM 206.

An access procedure of the area table 207 is described below. A number of the address translation table-sub on RAM necessary in this example is "364" as calculated by Formula (5) described above. The use of the area table enables to find out the physical address of the address translation table-sub on RAM from the logical address LPN. Specifically, if data of 4 B in size is read from an address obtained by offsetting the head address of the area table by 1456 B that is obtained by multiplying "364" by a size of one physical address, namely 4 B, the physical address of the address translation table-sub on RAM (LPT-S#364) will be obtained. If this physical address is designated as the start address and the data of 4 KB in size is read from the NVM 205, the address translation table-sub on RAM (LPT-S#364) will be obtained.

This address translation table-sub on RAM (LPT-S#364) is overwritten on the invalid cache of the corresponding entry on the RAM 206, namely the entry 44 described above to update the address translation table-sub on RAM (LPT-SR#364). A tag 216 is calculated by the above-mentioned method and is held in the address translation table cache LPT-C. Moreover, a valid flag 214 is made valid. Furthermore, a dirty flag 215 is cleared to make it indicates a clean cache (indicating that the address translation table-sub on RAM (LPT-S) on the NVM 205 and the address translation table-sub on RAM (LPT-SR) on the RAM 206 have an identical content).

Figure 13:
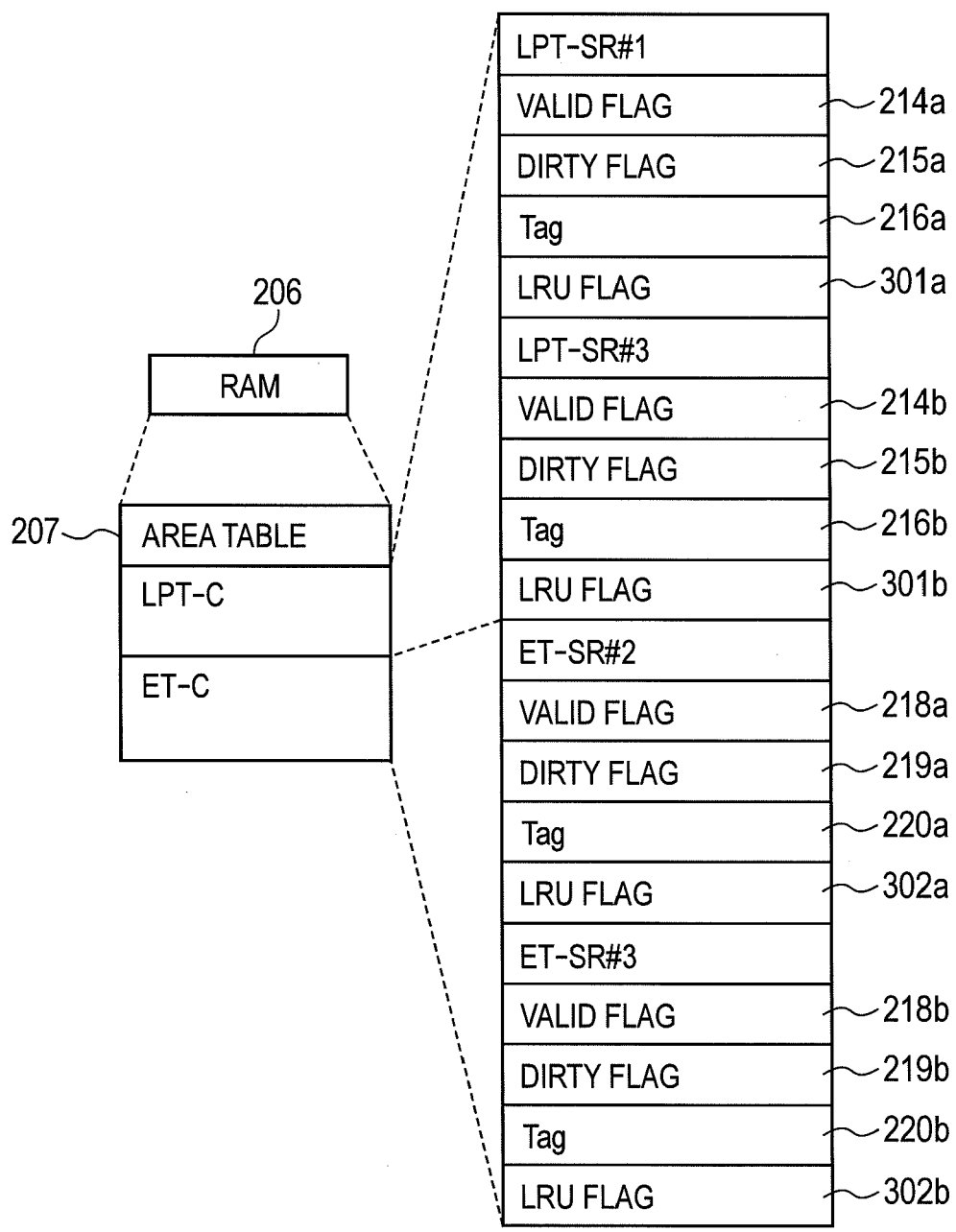
FIG. 13 is a diagram showing a modification of a configuration of RAM in the control method of the non-volatile storage shown in FIG. 1.

When the cache control is performed by the LRU system, an LRU flag shown in FIG. 13 described later is cleared to zero, which indicates that it is a most recently accessed cache. Furthermore, the LRU flags of other caches belonging to the entry 44 are incremented.

<Problem when Address Translation Table is Placed in RAM (Especially DRAM)>

Figure 4:
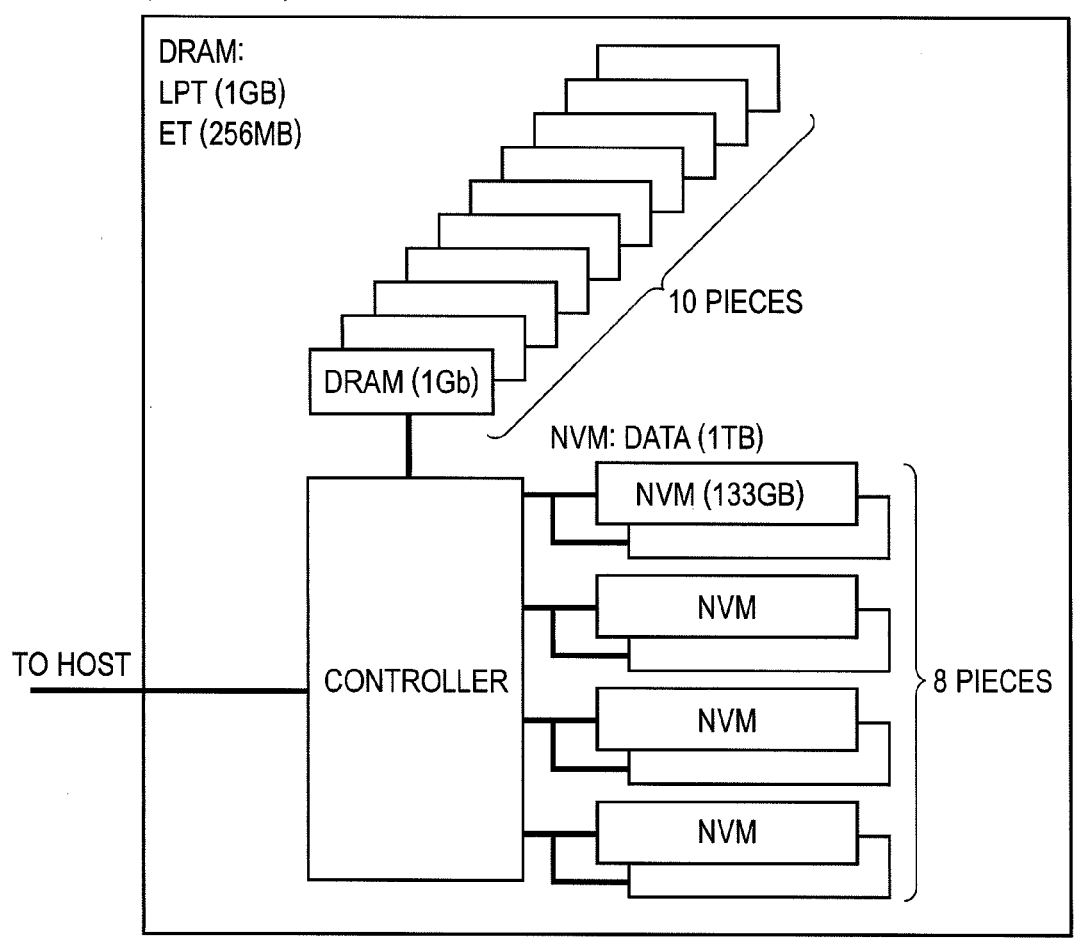
FIG. 4 is a diagram showing one example configuration for explaining a problem of 1-TB capacity in the related art as opposed to the non-volatile storage shown in FIG. 1.

A problem when the address translation table LPT described above is placed in the RAM 206, especially in the DRAM, (related art to this embodiment) will be explained in detail using FIG. 4. FIG. 4 is a diagram showing one example configuration for explaining the problem with a capacity of 1 TB.

The data size of the address translation table LPT of the SSD of 1-TB capacity becomes 1 GB. Moreover, the data size of the erase table ET becomes 256 MB. If the capacity per DRAM chip is set to 1 Gb, the number of DRAM chips will be 10. Since the capacity of the NVM needs to possess the data area, a backup area of the address translation table at the time of power supply cutoff, and a backup area and an auxiliary area (here, it is assumed to be 3%) of the erase table, it becomes a capacity of 133 GB per chip, and the number of NVM chips becomes eight, for example.

Since in the DRAM, its cell area (area needed per bit) is larger than that of the NVM, the DRAM has a higher cost-per-bit than the NVM. Moreover, seeing change of the cost-per-bit in 1990 to 2010 and a future prediction of ITRS (International Technology Roadmap for Semiconductors), a cost ratio of DRAM and NAND flash memories also continues to expand in the future. Therefore, in the case where the management information is put on the DRAM, a ratio of the number of chips of the DRAM to the number of chips of the NVM continues to increase. That is, it leads to cost increase of the DRAM.

Moreover, since the DRAM is volatile memory, it is necessary to write the management information in the NVM at the time of power supply cutoff, but if the data size on the DRAM is large, a possibility of data missing at the time of sudden power supply cutoff is high, and therefore its reliability will lower.

Furthermore, a problem in the case where the address translation table LPT is placed on the NVM and the address translation table cache LPT-C is not used will be explained.

At this time, in order to access the data on the NVM, it is necessary to access the address translation table LPT on the NVM. Therefore, at least two or more accesses to the NVM occur to one access to data of the SSD.

Moreover, a problem of a method whereby the address translation table LPT is divided into multiple address translation tables-sub on RAM (LPT-Ss) and only one of them is buffered in the RAM 206 will be explained.

In the case of an information storage device to which sequential accesses are mainly given, like a memory card, a memory card with high sequential access performance can be provided by holding only one address translation table-sub on RAM (LPT-S) in the RAM 206. However, as a result of analyzing an access request from the host device, such as a personal computer, a workstation, and a server for an enterprise by the present inventors, it turned out that since an access from the host device arises to a wide range of logical addresses, the SSD could not be efficiently controlled by the method in which only one address translation table-sub on RAM (LPT-S) was buffered in the RAM 206.

For example, in the case of migration of a file, there arise accesses to two or more places of the management information and data portions, such as an MFT (master file table) and a folder index in a FAT (file allocation table), a DCT (directory management table), and an NTFS (NT File System). The inventors found that since by a method in which only one of the address translation tables-sub on RAM (LPT-Ss) is buffered, the address translation table-sub on RAM (LPT-S) was discarded each time a separated address of the logical address was accessed, an access efficiency lowered.

<Advantage in the Case of Using Address Translation Table Cache>

Figure 5:
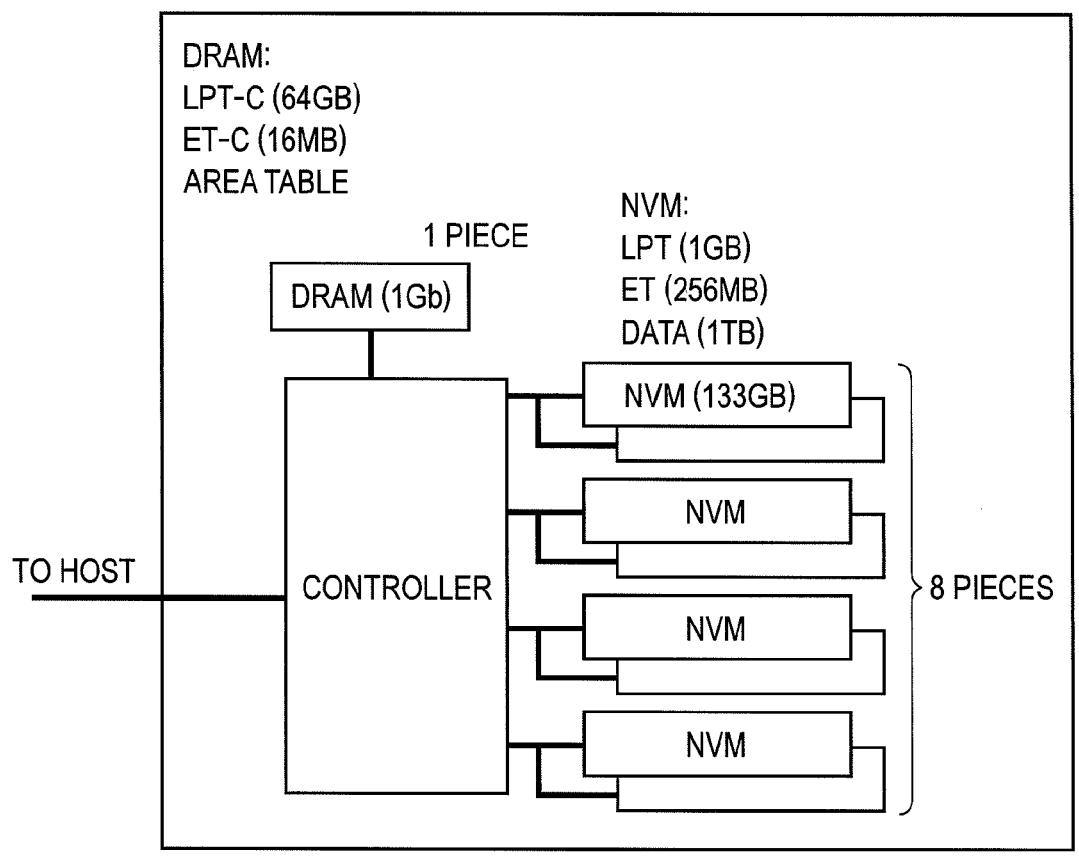
FIG. 5 is a diagram showing one example configuration for explaining a problem of 1-TB capacity in the non-volatile storage shown in FIG. 1.

An advantage when using the address translation table cache LPT-C (this embodiment) will be explained in detail using FIG. 5 in contrast to FIG. 4 described above. FIG. 5 is a diagram showing one configuration example for explaining how to solve the problem associated with a capacity of 1 TB.

The capacity per chip of the DRAM is 1 Gb. The capacity per chip of the NVM is 133 GB, and the number thereof is eight. The address translation table LPT and the erase table ET are placed on the NVM. The address translation table cache LPT-C (data size 64 MB), the erase table cache ET-C (data size 16 MB), and the area table (data size 1280 KB) are placed on the DRAM. Since the sum total of those data sizes is less than or equal to 1 Gb, namely 128 MB, the number of chips of the DRAM can be made unity. Therefore, the cost can be reduced as compared with the case where the address translation table LPT is placed on the DRAM.

Moreover, as described above, when the data hits in the address translation table cache LPT-C, there is a case when the number of accesses to the NVM in response to the access request from the host device is only one time. Therefore, as compared with the case where the address translation table cache LPT-C is not used and the case of using the method in which only one of the address translation tables-sub on RAM is buffered in the RAM 206, it is possible to access the data of the SSD efficiently, which enables to provide a high-performance and high-reliability SSD.

Incidentally, it goes without saying that performance improvement is achieved by using the erase table cache ET-C, like the address translation table cache LPT-C.

The performance when the erase table cache ET-C is used will be explained in more details. As an example, consider a case where the number of channels of the NVM is four ch's. The physical page size of the NVM chip shall be 4 KB, and the number of planes shall be two. A random write performance test is considered as a test pattern. Suppose that eight random write instructions in units of 4 KB are transmitted from the host device 201. A total data size becomes 32 KB.

First, in the case where the erase table cache is not used and the erase table ET is provided on the NVM, since the SSD controller can determine a channel of a write destination, data of 8 KB per ch can be written. In the case where the NVM has a multiplane accessing function, data of 8 KB per channel can be written by waiting the writing time to an NVM array only once after transmitting data of 8 KB to a register equivalent to two planes of the NVM per ch.

Next, the erase table ET is updated. Because of the write instruction to a random address, the addresses that should be updated in the erase table ET are dispersed and, in many cases, updating of the erase table ET at eight places becomes necessary. In the case where the erase table ET exists only in one NVM chip, it is necessary to perform eight write accesses to the chip. Even if multiplane writing is used, the number of times of writing to the NVM array per plane becomes four times, and the updating of the erase table ET takes a time that is at least four times as much as the writing time to the NVM array. Even when distributing the erase table ET onto multiple chips and performing recording, it is necessary to wait at least one writing time to write in the NVM array.

In contrast to this, in the case of using the erase table cache ET-C, when in the updating of the erase table in response to random writing of data, the erase table cache ET-C of an area in which the random writing is performed is provided, even if eight random write instructions each in units of 4 KB are transmitted, there will be a case where the writing to the NVM array will be unnecessary. Especially, when the logical address space in which a random write test is performed is narrow and all the erase information of the pertinent logical address space can be put into the erase table cache, the number of time of writing to the NVM array can be reduced.

Regarding the access to the address translation table LPT, like the access to the erase table ET, the number of times of update of the address translation table LPT on the NVM can be reduced by using the address translation table cache LPT-C; therefore, access performance of the SSD 202 can be enhanced.

Furthermore, since a frequency of updating of the address translation table LPT and the erase table ET can be reduced, the number of times of writing and the number of erasures to the NVM 205 can be reduced. For this reason, the reliability of the SSD 202 can be improved and especially its lifetime can be extended.

Moreover, an operating power of the SSD 202 can be reduced by reduction of the number of accesses to the NVM 205. This does away with an air cooling fan for cooling the SSD 202, which can eliminate malfunction of the SSD 202 caused by failure of the fan. As a result, the high-reliability SSD 202 can be provided. Furthermore, it is made space-saving by reduction of the number of parts. Thereby, SSDs intended for a small-sized PC, especially a notebook PC, a tablet computer using Windows Phone (registered trademark), iOS (registered trademark), or Android (registered trademark) as its OS and a smart phone, and SSDs intended for a high-density server can be provided.

As compared with the buffering, the cache control described in this embodiment has the following features. When the cache control is performed on the address translation table LPT, the address translation table-sub on RAM (LPT-S) is copied to the RAM 206 more than once. In the case of buffering, the number of the address translation table-sub on RAM (LPT-S) copied to the RAM 206 is unity. When the cache control is performed on the erase table ET, the erase table-sub on RAM (ET-S) is copied to the RAM 206 more than once. In the case of the buffering, the number of the erase tables-sub on RAM (ET-Ss) copied to the RAM 206 is unity.

Moreover, as compared with the buffering, the cache control described in this embodiment can provide the following features. It has the valid flags 214, 218, or the dirty flags 215, 219, or LRU flags 301, 302 that are pieces of the management information of the cache.

Furthermore, a control method is different. In the case of buffering, when the buffer copied to the RAM 206 does not contain the logical address LPN that should be accessed, all the data in the buffer is discarded, and one of the address translation tables-sub on RAM (LPT-Ss) is copied to the RAM 206 from the address translation table LPT on the NVM 205. However, in the case of the cache control, it is not necessary to discard all the data in the address translation table cache LPT-C on the RAM 206. Only some data in the cache can be discarded by referring to an access frequency etc.

In what was described above, although the DRAM (the RAM 206) was taken as an example and explained as a place of the address translation table LPT, the table only needs to memory capable of being accessed faster than the NVM 205. For example, FeRAM (ferroelectric memory), phase change memory, SLC NAND (NAND flash memory of a single level cell), and NOR-type flash memory can be used.

<Operation to Read Request>

Figure 6:
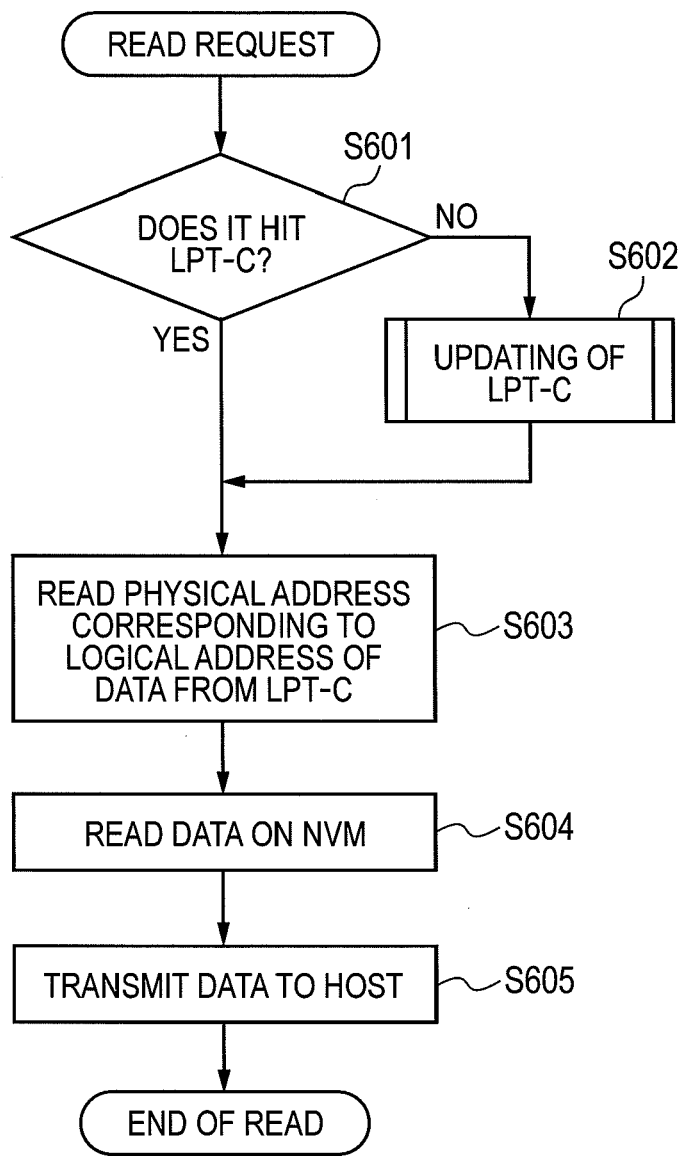
FIG. 6 is a diagram showing one example of a flowchart for explaining a read operation in a control method of the non-volatile storage shown in FIG. 1.

In the SSD 202 described above, an operation to a read request from the host device 201 will be explained using FIG. 6. FIG. 6 shows an example of a flowchart for explaining a read operation. An operation to this read request from the host device 201 is executed by the control of the SSD controller that is the control unit 204 in the SSD 202.

The address translation table LPT is a table for translating the logical address specified when the host device issues a request to the physical address of the NVM 205 (hereafter, referred to as the logical address). The address translation table LPT is divided into multiple address translation tables-sub on RAM (LPT-Ss) and is managed being divided.

First, when the host device 201 issues a request of read access to the data area existing in the NVM 205 that the SSD 202 has by the logical address, it is determined whether the address translation table-sub on RAM (LPT-S) to the pertinent logical address exists in the address translation table cache LPT-C placed on the RAM (DRAM) 206, namely, whether the address translation table cache LPT-C hits (S601).

A hit determination is performed using the cache management information, such as tags and valid flags, provided in the address translation table cache LPT-C. A detailed determination method will be described later. Regarding the address translation table cache LPT-C, multiple address translation tables-sub on RAM (LPT-Ss) are copied so that a hit ratio of the cache may become high. Examples of the host device 201 are a personal computer and a workstation. Alternatively, it is a tablet computer or a control unit of a smart phone.

When the address translation table cache LPT-C is missed (S601-N), the address translation table cache LPT-C described later (FIG. 7) is updated (S602).

When the address translation table cache LPT-C hit occurs (S601-Y), next, the physical address of the NVM 205 corresponding to the logical address of the data is read from the address translation table cache LPT-C (S603). Furthermore, the data of the physical address is read from the NVM 205 (S604), and the data is transmitted to the host device 201 (S605).

Using the above method, the SSD 202 (specifically, the SSD controller that is the control unit 204 in the SSD 202) can perform data transmission to the read request from the host device 201.

<Operation to Update Request of Address Translation Table Cache>

Figure 7:
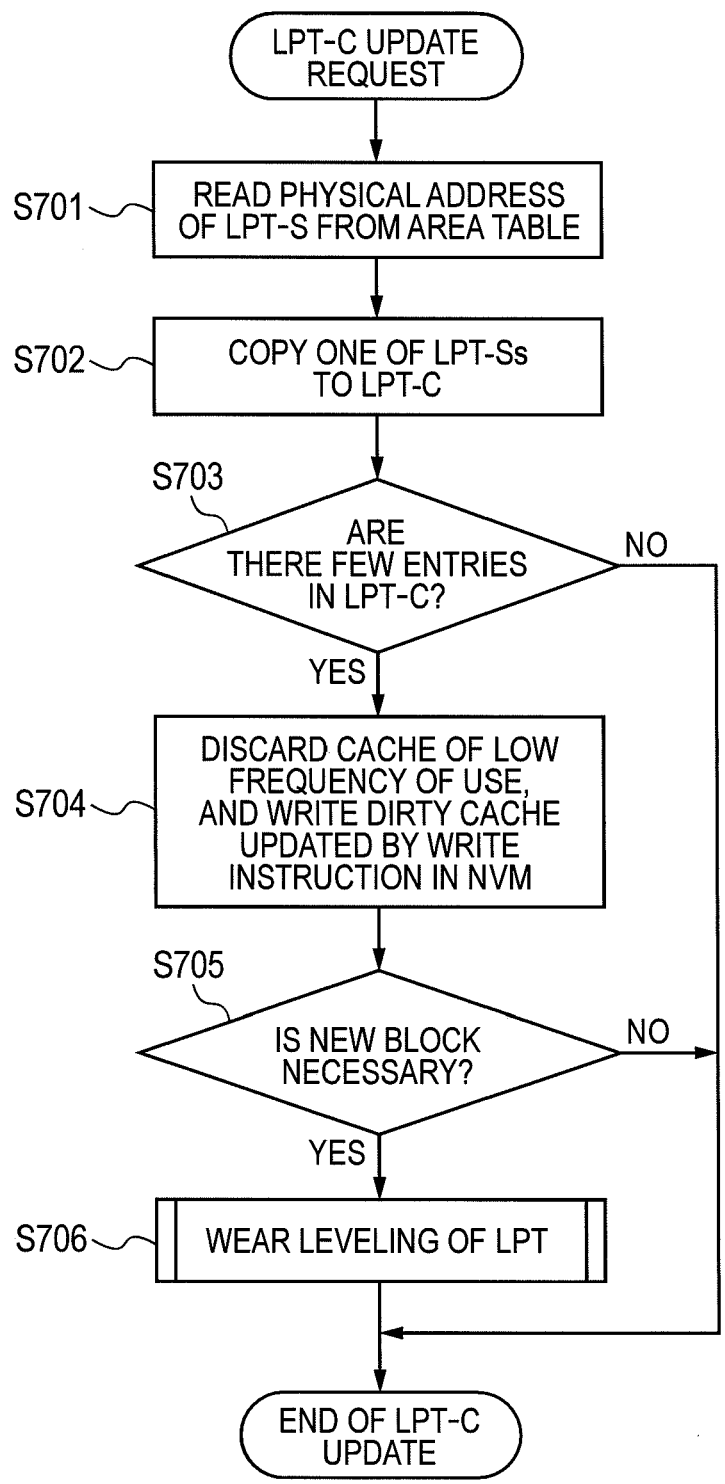
FIG. 7 is a diagram showing one example of a flowchart for explaining an update operation of an address translation table cache in the control method of the non-volatile storage shown in FIG. 1.

A processing when an update request (S602) of the address translation table cache LPT-C described above (FIG. 6-S602) is issued will be explained using FIG. 7. FIG. 7 is a diagram showing one example of a flowchart for explaining an update operation of the address translation table cache LPT-C.

Figure 14:
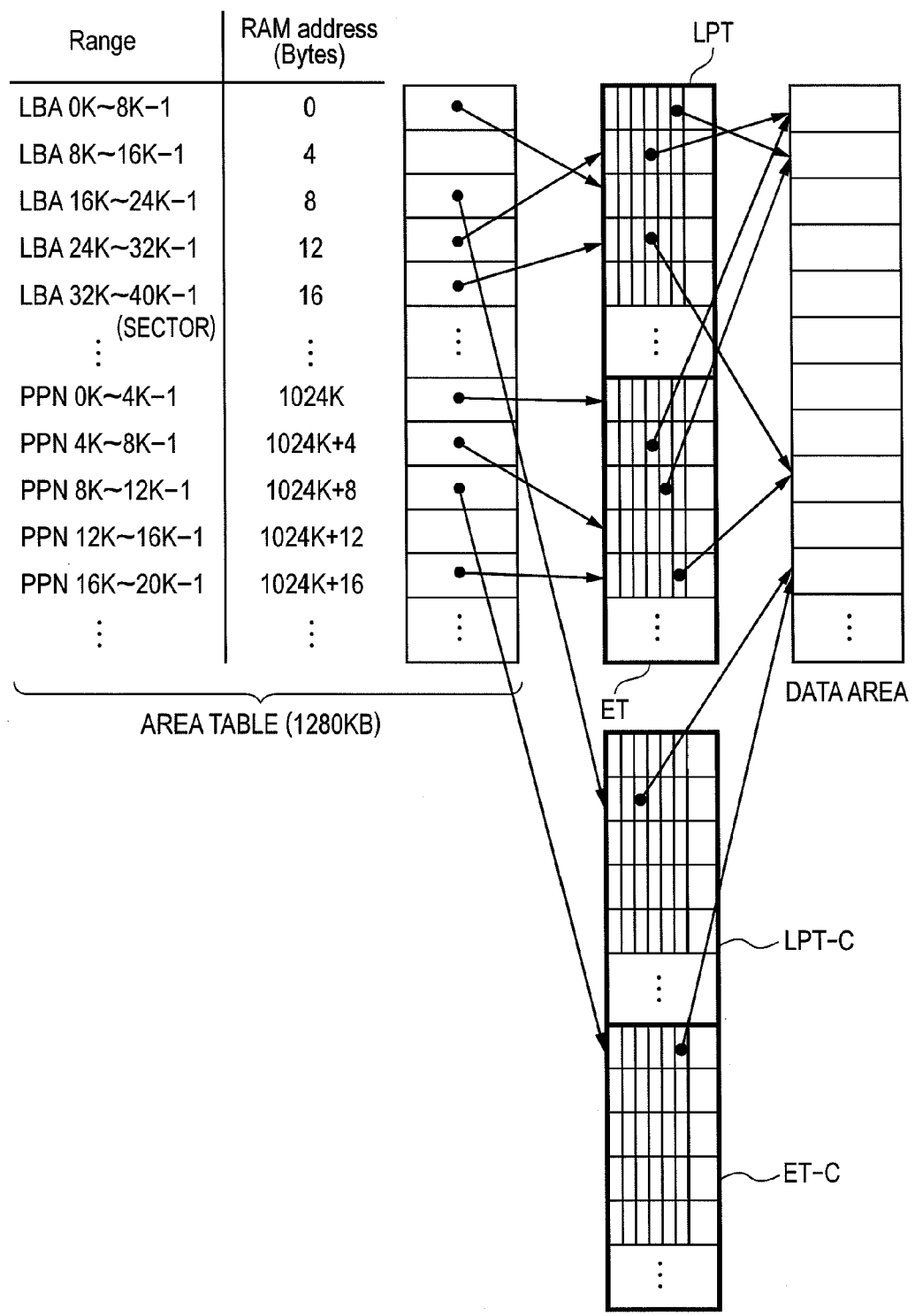
FIG. 14 is a diagram for explaining an area table in the control method of the non-volatile storage shown in FIG. 1.

First, a table number of the address translation table-sub on RAM (LPT-S) that should be read is determined from the logical address. Next, the physical address of the address translation table-sub on RAM (LPT-S) of the corresponding table number is read from the area table on the RAM (DRAM) 206 (S701). Details of the area table will be described later (FIG. 14). Furthermore, the address translation table-sub on RAM (LPT-S) stored at the pertinent physical address is read from the NVM 205, and is copied to the RAM 206 (S702). That is, one of the address translation tables-sub on RAM (LPT-Ss) is copied to the address translation table cache LPT-C.

Next, a free space of the address translation table cache LPT-C is checked (S703). That is, it is determined whether the address translation table cache LPT-C has few space. If there exists the free space more than or equal to a threshold (S703-N), updating of the address translation table cache LPT-C will be ended.

It is controllable so that the free space may always exist in the address translation table cache LPT-C. This is done because if the entire address translation table cache LPT-C is filled up with a dirty cache, it is necessary to write back the dirty cache to the NVM 205 before copying the address translation table-sub on RAM (LPT-S) to the RAM 206, which lowers the access performance of the SSD 202. By making the free space always exist in the address translation table cache LPT-C, it is possible to provide the SSD 202 that has high access performance by a simple control.

Alternatively, it can be controlled so that the address translation table cache LPT-C may always have a fixed quantity of clean caches. In this case, even if there is no free space in the address translation table cache LPT-C, the clean cache can be discarded and the address translation table-sub on RAM (LPT-S) can be copied to that area. When discarding the clean cache, since no access to the NVM 205 arises, the cache can be discarded in a short time. Therefore, the SSD 202 that has a high cache hit ratio and has high access performance can be provided.

When the free space is less than the threshold (S703-Y), all the data in the address translation table cache LPT-C can be discarded. At this time, the cache (the dirty cache) whose address in the table was updated by the write instruction is written back to the NVM 205 when the cache is discarded (S704). At this time, when a total data size of the dirty caches becomes more than or equal to a threshold, a control method in which all the data in the dirty cache is written back to the NVM 205 is also possible. In this control method, it is possible to set a writing unit when writing back the data to the NVM 205 to a data access size optimal for the NVM 205 (data size giving an excellent access efficiency to the NVM 205). Incidentally, regarding the access to the NVM 205, if the access is performed by a data size equal to page size×number of channels×number of planes per chip, the chip will be able to be accessed efficiently by a simple design of the controller.

Alternatively, when the above-mentioned free space is less than the threshold (S703-Y), all the data in the cache is not discarded but only some data thereof can be discarded. For example, how to use LRU (Least Recently Used) as a line eviction scheme will be explained using FIG. 13. FIG. 13 is a diagram showing a modification of a configuration of the RAM 206 of a method that uses the LRU. The LRU is an algorithm used in control methods of cache memory and virtual memory. This is a method in which the cache having a longest unused time is discarded.

Specifically, the LRU flags 301a and 301b are provided for every address translation table-sub on RAM (LPT-SR) in the address translation table cache LPT-C. The address translation table-sub on RAM (LPT-SR) is managed being divided into multiple entries. For example, when the number of the address translation tables-sub on RAM (LPT-SRs) is 16384, it is divided into 64 entries. 16384/64=256 address translation tables-sub on RAM (LPT-SRs) belong to one entry.

When performing the determination of the cache hit, the entry that should be retrieved can be determined using information of lower 6 bits of the logical address LPN. For example, if the lower six bits are "000000," the entry 0 will be retrieved; if they are "000001," the entry 1 will be retrieved. The tag 216 is used to search the entries. Remaining upper bits of the logical address are used for the tag 216. If one logical address is expressed with 4 B (byte), namely 32 bits, the upper 26 bits excluding the lower 6 bits will become the tag 216.

If the tag calculated from the address to search and the tag currently held in the each address translation table-sub on RAM (LPT-SR) coincide with each other, it will be determined that the cache hit occurs. That is, address translation of the logical address LPN to the physical address PPN is performed using the address translation table cache LPT-C. When the address translation table-sub on RAM (LPT-SR) is used, the LRU flag of the LPT-SR is set to 0, and the LRU flags of all the LPT-SRs of the entries to which the LPT-SR belongs are incremented (the value of the each LRU flag is increased only by unity).

Next, a value of the LRU flag is checked at the time of the determination as to whether a content of the cache is discarded. Since if the value of the LRU flag is large, it will turn out that it is not used for a long time after being used last, the content of the cache will be discarded. By the above method, the content of the cache whose frequency of use is small can be precisely discarded preferentially, and an efficient cache control can be performed.

The erase table-sub on RAM, ET-SR is similarly controlled using the LRU flags 302a and 302b. It is also possible that the LRU may be simplified and a quasi-LRU instruction cache eviction policy that can perform the cache control at higher speed may be used Furthermore, in the writing, it is determined whether a new block is necessary (S705). When it is not necessary (S705-N), the update operation of the address translation table cache LPT-C is ended; when it is necessary (S705-Y), wear leveling of the address translation table LPT described later (FIG. 11) is performed (S706).

Using the above method, the updating of the address translation table, cache LPT-C in the operation to the read request described above (FIG. 6) can be performed.

<Operation to Rewrite Request>

Figure 8:
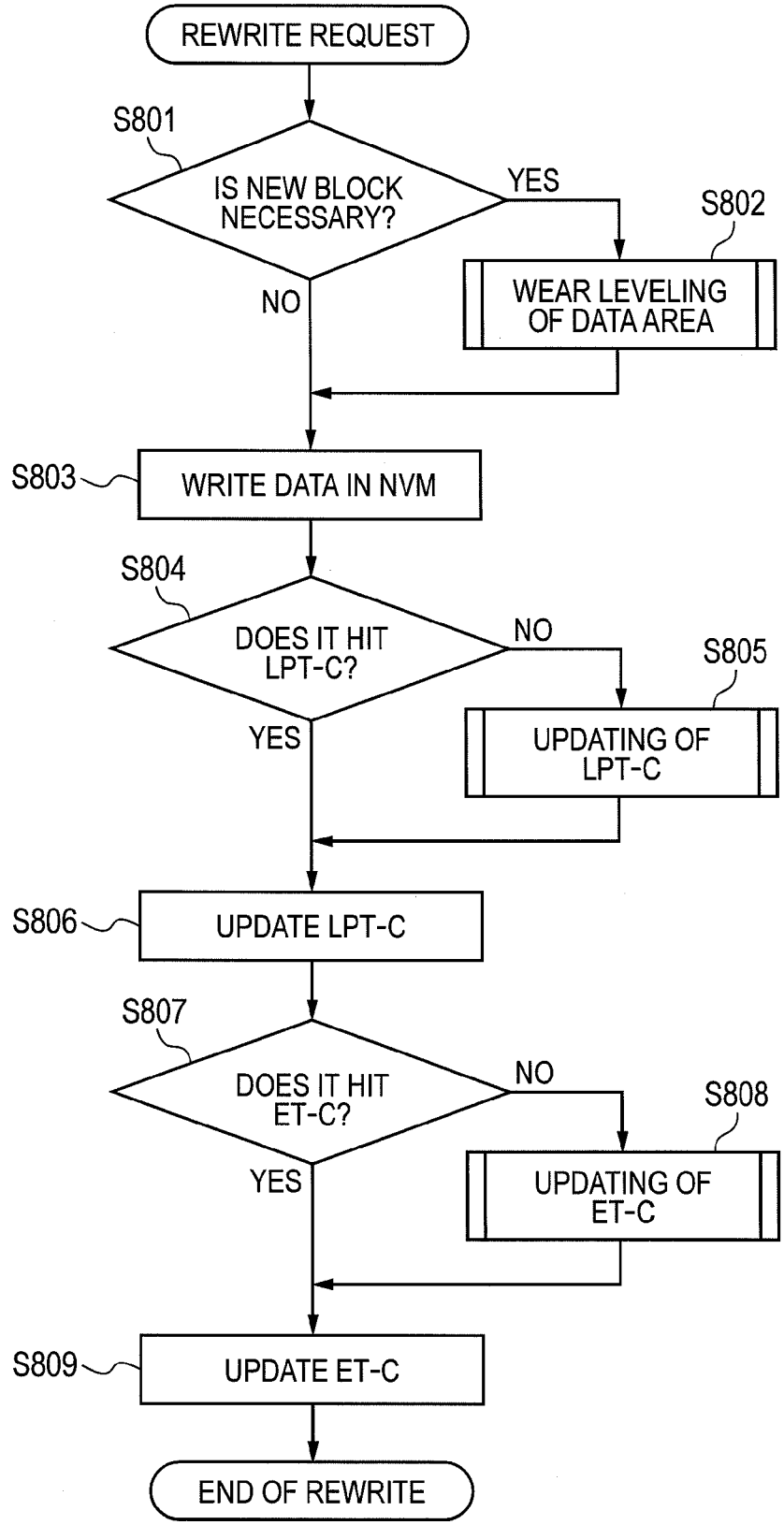
FIG. 8 is a diagram showing one example of a flowchart for explaining a rewrite operation in the control method of the non-volatile storage shown in FIG. 1.

Next, a control method when the host device 201 issues the rewrite request will be explained using FIG. 8. FIG. 8 is a diagram showing one example of a flowchart for explaining the rewrite operation. The operation to this rewrite request from the host device 201 is executed by a control of the SSD controller that is the control unit 204 in the SSD 202.

Figure 10:
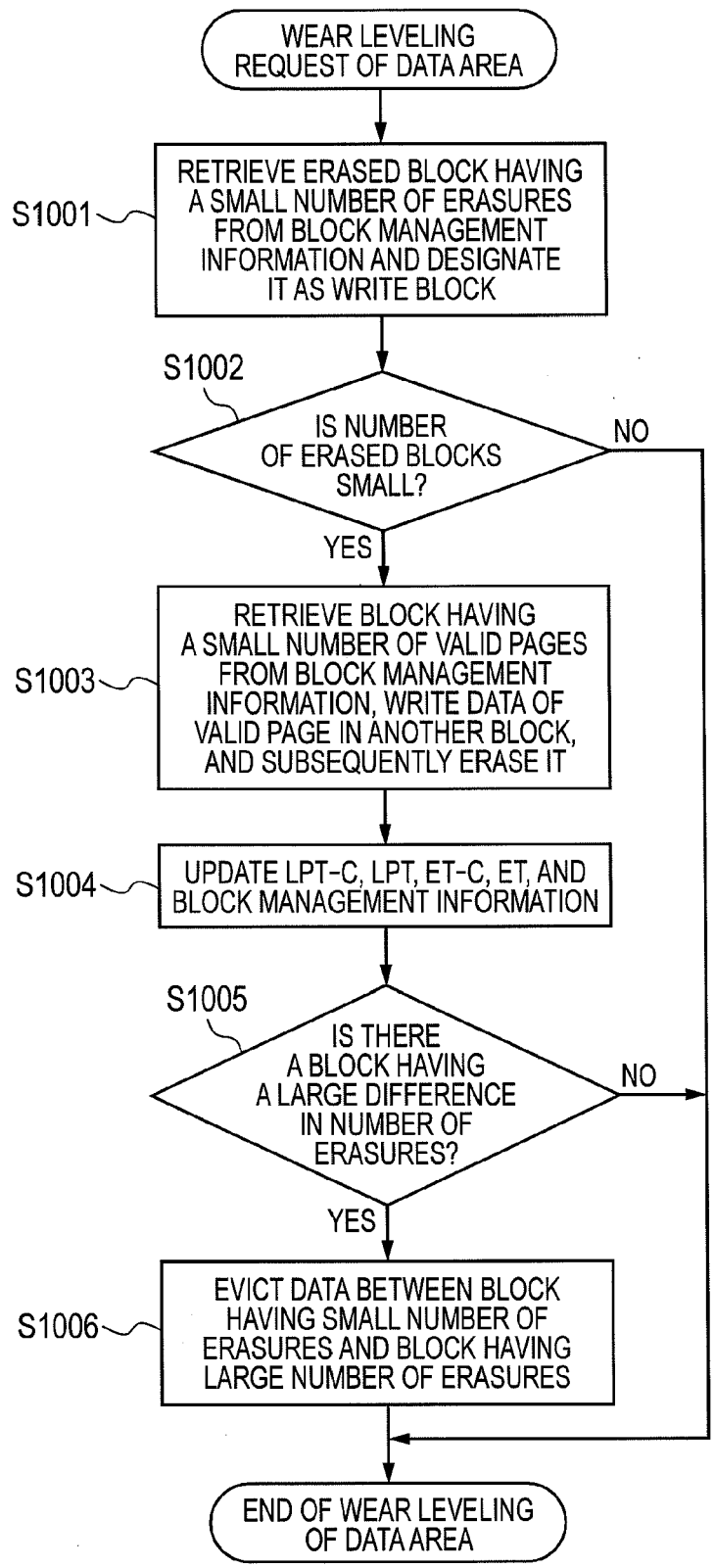
FIG. 10 is a diagram showing one example of a flowchart for explaining a wear leveling operation of a data area in the control method of the non-volatile storage shown in FIG. 1.

First, it is determined whether the new block is necessary in the writing of the NVM 205 (S801). In this embodiment, regarding a writing order of the NVM 205, it is assumed that there is a restriction of writing it in an order of pages consecutive within the block. In this case, when performing the writing next to the writing in the last page in the block, it can be determined that the new block is necessary. When the new block is necessary (S801-Y), wear leveling of the data area is performed and the new block is determined (S802). A detailed procedure will be described later (FIG. 10).

Next, data is written in the NVM 205 (S803). Furthermore, the block management information is updated. Details of the block management information are just as described above (FIG. 3). It is also possible that a write buffer is provided on the SRAM or the RAM (DRAM) 206 in the controller unit (the SSD controller) 204 and the data is written in the NVM 205 in units of a data size that gives an excellent accessing efficiency to the NVM 205. If the block is the new block, the physical address will be written in a head page in the block; if it is not the new block, the physical address will be written in a page next to a page in which the data is written in last time. Incidentally, by holding a block number and a page number on the SRAM in the SSD controller, it is possible to determine the physical address without accessing the RAM (DRAM) 206 or the NVM 205, which enables a fast operation.

Next, it is determined whether the data hits in the address translation table cache LPT-C on the RAM (DRAM) 206 (S804). The determination of hitting can be performed using information of the tag contained in the cache. When no cache hit occurs (S804-N), the address translation table cache LPT-C is updated (S805). These details are as were described above (FIG. 7).

Next, the address translation table cache LPT-C is updated (S806). The address translation table cache LPT-C corresponding to the logical address is selected, and the physical address stored at an address corresponding to the pertinent logical address is updated.

Next, a determination of hitting in the erase table cache ET-C is performed (S807). That is, it is determined whether the cache hit occurs in the erase table cache ET-C. The erase table ET stores information as to whether the page is erasable or unerasable for every page of the NVM 205. In addition to erasability/unerasability, for the purpose of operation verification and higher reliability of the SSD controller, information as to whether the page is erased, whether the page is a good or bad page, reliability, etc. can be stored. When there is the writing again to the logical address already written in the SSD 202, old information becomes unnecessary and its corresponding physical address (an old physical address) becomes erasable.

The physical pages that became erasable are collectively erased by garbage collection of the data area described later (FIG. 10). Incidentally, the newly written physical address is designated as a new physical address. The erase table ET is cache-controlled as well, like the address translation table LPT. A cache is provided on the RAM (DRAM) 206.

If the erase table cache ET-C corresponding to the old physical address is missed (S807-N), the erase table cache ET-C (FIG. 9) will be updated (S808) described later. When updating the cache, the physical address (an erase destination physical address) that is due to be erased is used. The erase table ET should just have at least information as to whether the page of the NVM 205 is erasable or unerasable, for example, a translation table for translating physical addresses to the logical addresses can also store the erase information.

For example, if the logical address corresponding to a certain physical address is an invalid address (an address that is not accessed from the host device 201), it is understood that the physical address is erasable. That is, the translation table for translating physical addresses to logical addresses can be used instead of the erase table ET. In this case, it becomes possible to perform static wear leveling described later (FIG. 10) at high speed, and it has an advantage of providing the SSD 202 of high access performance.

Furthermore, the erase table cache ET-C is updated (S809). Specifically, the erase table ET corresponding to old physical addresses is marked as erasable. Moreover, when information of being erased for each page is held, the erase table corresponding to new addresses is marked as already written and unerasable.

Finally, a response of rewriting completion is transmitted to the host device 201.

Using the above method, the SSD 202 (specifically, the SSD controller that is the control unit 204 in the SSD 202) can perform a control when the host device 201 issues the rewrite request.

<Operation to Update Request of Erase Table Cache>

Figure 9:
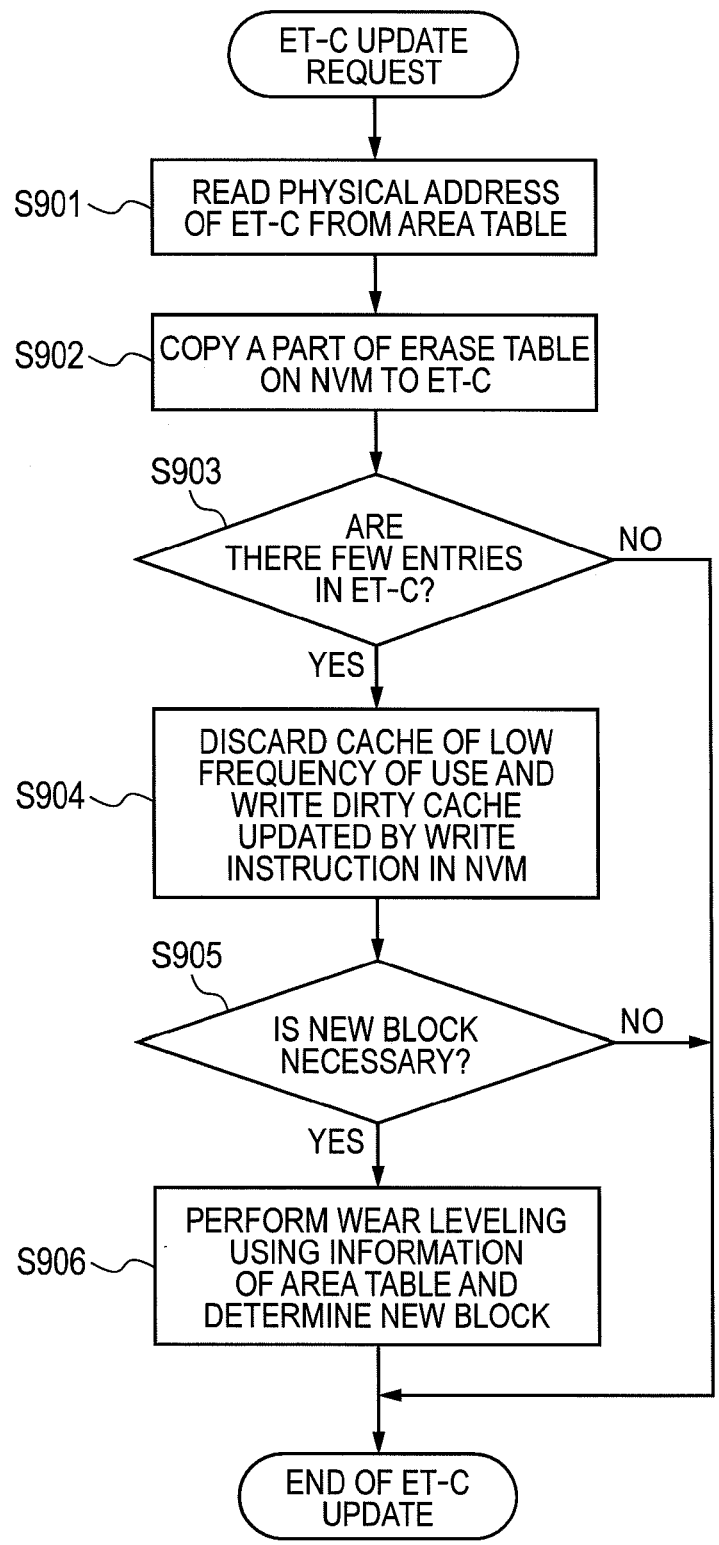
FIG. 9 is a diagram showing one example of a flowchart for explaining an update operation of an erase table cache in the control method of the non-volatile storage shown in FIG. 1.

A control method to an update request of the erase table cache ET-C described above (FIG. 8-S808) will be explained using FIG. 9. FIG. 9 is a diagram showing one example of a flowchart for explaining an update operation of the erase table cache ET-C.

First, the physical address of the erase table-sub on RAM (ET-S) that contains the erase destination physical address is read from the area table on the RAM (DRAM) 206 (S901). Next, part of the erase table ET (the erase table-sub on RAM (ET-S)) is copied to the erase table cache ET-C on the RAM (DRAM) 206 from a pertinent address of the NVM 205 (S902).

Next, the free space of the erase table cache ET-C is checked (S903). That is, it is determined whether the erase table cache ET-C has few space. If there is the free space more than or equal to the threshold (S903-N), the updating of the erase table cache ET-C will be ended.

If the free space is less than the threshold (S903-Y), the erase table cache ET-C of low frequency of use will be discarded. As a method for determining the magnitude of frequency of use, there is a method described above (FIG. 13) using the LRU flag. The dirty cache in which the erase information in the erase table-sub on RAM (ET-SR) was updated by the writing is written back to the NVM 205 when discarding the cache (S904). It goes without saying that when the total data size of the dirty cache becomes more than or equal to the threshold at this time, a control method whereby all the data of the dirty cache is written back to the NVM 205 can be taken.

Furthermore, in the writing, it is determined whether the new block is necessary (S905). If it is not necessary (S905-N), updating of the erase table cache ET-C is ended; if it is necessary (S905-Y), the wear leveling of the address translation table LPT described later (FIG. 11) is performed using information on the area table, and the new block is determined (S906).

Using the above method, a control to the update request of the erase table cache ET-C in the operation to the rewrite request described above (FIG. 8) can be performed.

<Operation to Wear Leveling Request of Data Area>

The wear leveling of the data area described above (FIG. 8-S802) will be explained using FIG. 10. FIG. 10 is a diagram showing one example of a flowchart for explaining a wear leveling operation of the data area.

First, dynamic wear leveling is performed. The dynamic wear leveling is a control method whereby the number of erasures is leveled by selecting a block having a small number of erasures when determining a block in which data is newly written, which is one of the wear leveling methods.

Specifically, with reference to the block management information on the RAM (DRAM) 206 or the SRAM in the control unit (the SSD controller) 204, an erased block having a small number of erasures is retrieved, and the retrieved block is designated as a block on which the writing is to be performed next (S1001). At this time, by using a method in which the minimum number of erasures in all the blocks is held and a block having a number equal to that number is used or a block having a number less than or equal to the minimum number of erasures plus a threshold, a necessity of searching information of all the erased blocks is eliminated, and therefore the wear leveling can be performed at high speed.

Next, it is determined whether a total number of erased blocks is less than or equal to a threshold (whether an erased block count is small) (S1002). If it is larger than the threshold (S1002-N), the wear leveling of the data area will be ended.

If it is less than or equal to the threshold (S1002-Y), the garbage collection is performed first. The garbage collection is a control method for generating the erased block by copying only a valid page of a block containing the invalid page to an other block and subsequently erasing the pertinent block, which enables the number of times of rewriting in the NVM 205 to be leveled by being combined with the dynamic wear leveling.

Specifically, with reference to the block management information, the blocks in each of which the writing for data is completed are searched for a block having a small number of valid pages. All the blocks may be searched for a block having the smallest number of valid pages, or a certain ratio of blocks among all the blocks may be searched regarding the number of erasures and a block whose number of erasures is lower may be designated as a block to be erased. It is not necessarily required to retrieve a block having the number of erasures that becomes the minimum. By limiting the search just to search the number of erasures of a part of the blocks to a fixed accuracy, the blocks to be erased can be listed at high speed.

Furthermore, a content of the valid page contained in the block to be erased is copied to a new page in the block currently under the writing, and the valid page is erased after the writing (S1003). At this time, the garbage collection can be efficiently performed by retrieving multiple blocks to be erased simultaneously and erasing them.

The valid page is a page to which the host device 201 refers. A page that is not the valid page, namely the invalid page, is a page that is not referred to by the host device 201, namely a page such that a corresponding logical address does not exist. When the writing is performed from the host device 201, a written page becomes the valid page, which records that the physical address corresponding to the erase table ET or the erase table cache ET-C is the valid page. Next, when the writing is performed to the same logical address from the host device 201, the physical address will not be referred to hereafter. Then, it records that the physical address corresponding to the erase table ET or the erase table cache ET-C is the invalid page. The invalid page is a page in which unnecessary information was written, indicating that it is erasable.

Incidentally, any block is classified into a block under the writing, a block having been written, the erased block (an auxiliary block), and a bad block. Furthermore, the block under the writing and the block having been written are distinguished into blocks for data area, for address translation table, and for erase table, respectively. Furthermore, the erased block may be divided into a block for address translation table, for erase table, and for data, and may be managed. Since an access pattern is different between a block for the management information and a block for data, a control appropriate for the access pattern becomes possible by classifying them based on usage and managing each differently, which brings an effect of making the SSD 202 highly reliable. The above-mentioned classification of the blocks is managed by the block management information.

The number of erasures and the number of valid pages are recordable in the block management information further. By recording the number of erasures of each block, the dynamic wear leveling can be performed efficiently. Moreover, by recording the number of valid pages contained in the block, object blocks of the garbage collection can be searched at high speed.

Next, the address translation table cache LPT-C, the address translation table LPT, the erase table cache ET-C, the erase table ET, and the block management information are updated (S1004). For the determination of the table cache hit and a processing when the cache is missed, the same method as was described above can be used in the data rewrite request from the host device 201.

Furthermore, the static wear leveling of evicting a block having a large number of erasures and the block having a small number of erasures is performed. A purpose of the static wear leveling is to reduce a difference of number of erasures between the block having a small number of erasures and the block having a large number of erasures, and thereby to control so that all the blocks may be equally written, and it is one of the wear levelings. A specific procedure will be described below.

First, with reference to the block management information, it is checked whether a difference of the number of erasures between the block having a small number of erasures and the block having a large number of erasures is more than or equal to the threshold (whether there is a block having a large difference of the number of erasures) (S1005). At this time, the numbers of erasures of all the blocks may be checked, or a part of blocks may be extracted and their numbers of erasures may be checked. By limiting the blocks whose numbers of erasures are to be checked, it is possible to determine in a short time whether the static wear leveling is executed.

Next, when the difference of the number of erasures is less than the threshold (S1005-N), the wear leveling of the data area is ended; when the difference of number of erasures between is more than or equal to the threshold (S1005-Y), the data having been written in the valid page of the block having a small number of erasures is written in the block currently under the writing, and the block of the copy source, namely the block having a small number of erasures, is erased (S1006). This is an eviction of the data between the block having a small number of erasures and the block having a large number of erasures. Multiple blocks can also be listed as erase candidates and be erased in a concurrent manner. In this case, the wear leveling can be efficiently performed by a simple control method.

Incidentally, it is not necessarily required to perform a determination of the garbage collection and a determination of the static wear leveling every time after the dynamic wear leveling, and these determinations can also be performed once for a fixed number of times.

Using the above method, the wear leveling of the data area in an operation to the rewrite request described above (FIG. 8) can be performed.

<Operation to Wear Leveling Request of Address Translation Table>

Figure 11:
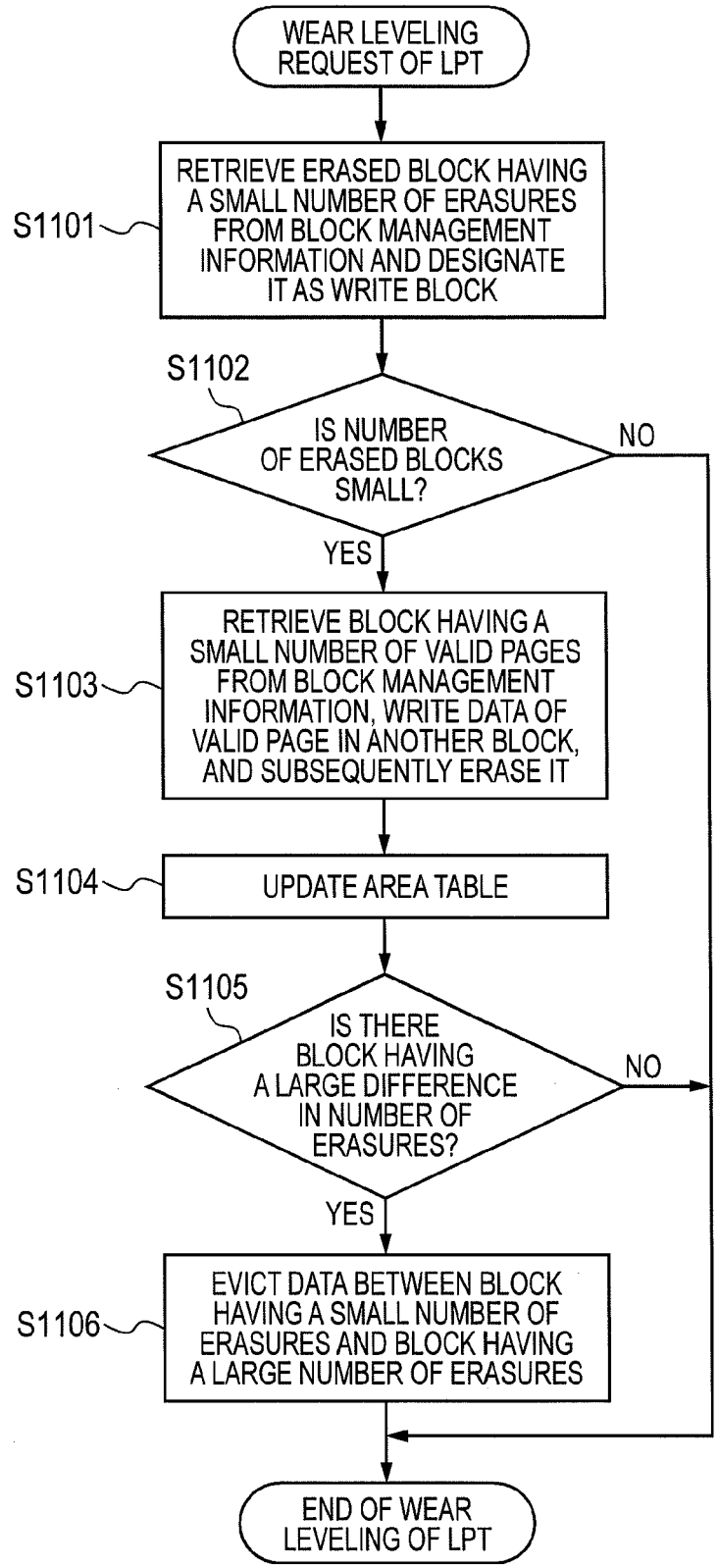
FIG. 11 is a diagram showing one example of a flowchart for explaining a wear leveling operation of the address translation table (area for storing data management information) in the control method of the non-volatile storage shown in FIG. 1.

A processing procedure of the wear leveling request of the address translation table LPT described above (FIG. 7-S706) will be described using FIG. 11. FIG. 11 is a diagram showing one example of a flowchart for explaining the wear leveling operation of the address translation table LPT (area for storing the data management information).

First, with reference to the block management information, a group of erased blocks is searched for the block having a small number of erasures, and that block is designated as a writing block (the dynamic wear leveling, S1101).

Next, it is determined whether the garbage collection is executed (S1102). Specifically, whether the total number of erased blocks is less than or equal to the threshold (whether the erased block count is small) is checked. When it is larger than the threshold (S1102-N), the wear leveling of the address translation table LPT is ended.

When the erased block count is less than or equal to the threshold (S1102-Y), the garbage collection is performed first. Specifically, with reference to the block management information, a block having a small number of valid pages is retrieved among blocks in each of which the writing for the address translation table is completed. At this time, only blocks allocated to the address translation table LPT may be searched, or blocks allocated to both the address translation table LPT and the erase table ET may be searched. Furthermore, blocks allocated to the address translation table LPT, the erase table ET, and the data area may be searched.

A content of the valid page contained in the block having a small number of valid pages is copied to a new page in the block currently under the writing, and is erased after the writing is completed (S1103). At this time, the garbage collection can be efficiently performed by simultaneously retrieving multiple blocks to be erased and erasing them.

Next, the area table and the block management information are updated (S1104). Furthermore, the static wear leveling that evicts the block having a large number of erasures and the block having a small number of erasures is performed. Specifically, with reference to the block management information, the difference of the number of erasures between the block having a small number of erasures and the block having a large number of erasures is more than or equal to the threshold (whether there is a block having a large difference of the number of erasures) (S1105).

Next, when the difference of the number of erasures is less than the threshold (S1105-N), the wear leveling of the address translation table LPT is ended; when the difference of the number of erasures is more than or equal to the threshold (S1105-Y), the address translation table information written in the valid page of the block having a small number of erasures is written in a block where the table is currently under the writing, and a block of the copy source, namely the block having a small number of erasures is erased (S1106). This is an eviction of data between the block having a small number of erasures and the block having a large number of erasures.

Using the above method, the wear leveling of the address translation table LPT in the operation to the update request of the address translation table cache LPT-C described above (FIG. 7) can be performed.

<Relationship Between Operating Time of SSD and Maximum Number of Block Erasures of NVM>

Figure 12:
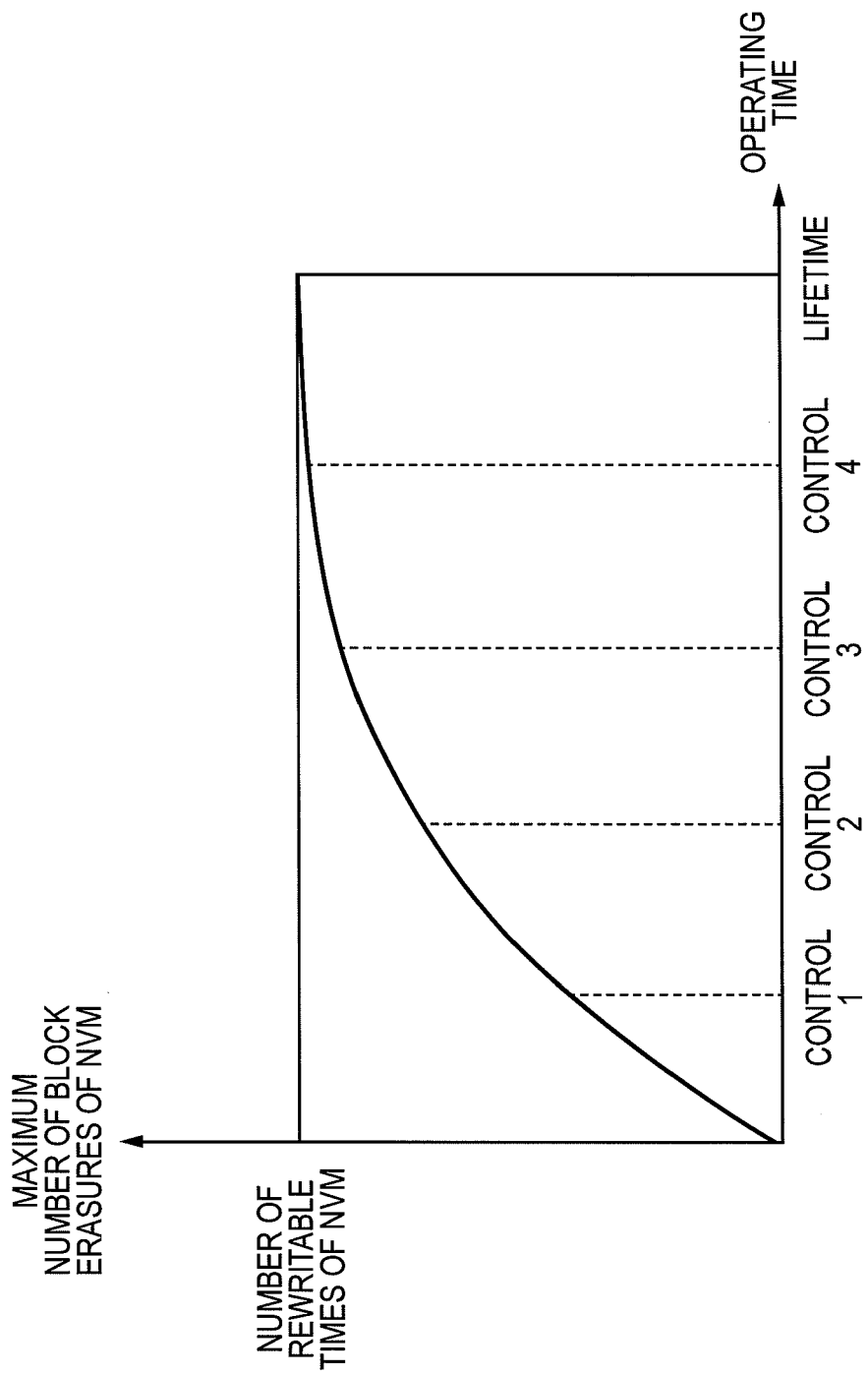
FIG. 12 is a diagram showing one example of a relationship between an operating time and a maximum number of block erasures.

A relationship between the operating time of the SSD 202 and the maximum number of block erasures of the NVM 205 will be explained using FIG. 12. FIG. 12 is a diagram showing one example of the relationship between the operating time (horizontal axis) and the maximum number of block erasures (vertical axis).

In FIG. 12, by three kinds of the wear levelings shown by controls 1 to 3, namely the dynamic wear leveling, the garbage collection, and the static wear leveling, the writing to a specific block of the NVM 205 in the SSD 202 is suppressed; and by making the writing occur in all the blocks equally, an increase in the maximum number of erasures of the NVM 205 accompanying an increase in the amount of the writing to the SSD 202 is suppressed. Furthermore, the increase in the maximum number of erasures can be suppressed by the wear leveling of the address translation table LPT and the erase table ET using the area table shown in the control 4. Incidentally, a block whose maximum number of erasures reached the prescribed value becomes unerasable, becoming a bad block. A time when the SSD capacity seen from the host device 201 becomes less than or equal to the prescribed value due to an increase of the bad blocks becomes the lifetime of the SSD 202.

Although the RAM (DRAM) 206 can be used as a storing place of the address translation table cache LPT-C, what is necessary is just being memory capable of being accessed faster than the NVM 205, and FeRAM (ferroelectric memory) and phase change memory can be used, for example. Moreover, in addition to this, in the case where MLC NAND flash memory is used as the NVM 205, SLC NAND (NAND flash memory of a single level cell) can be used. Moreover, in the case where the NAND flash memory is used as the NVM 205, NOR flash memory can be used.

<Details of Area Table>

Figure 15A:
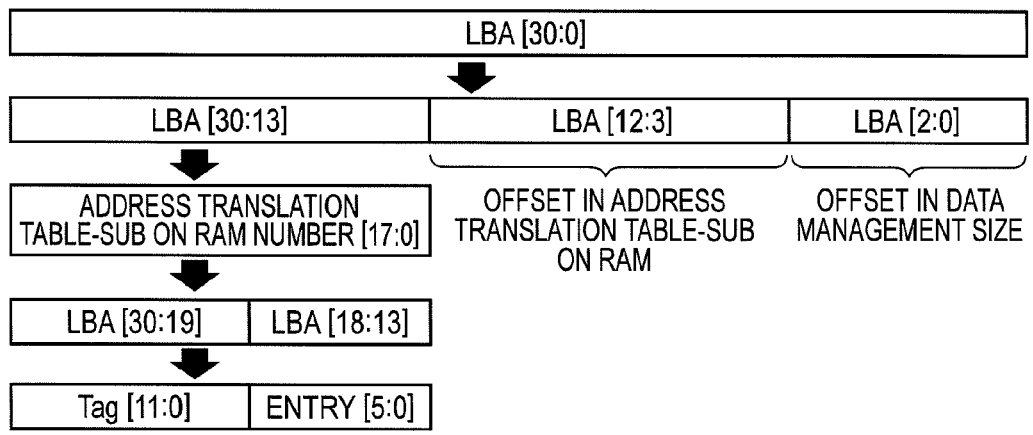
FIGS. 15A to 15C are diagrams for explaining a logical address and a physical address in the control method of the non-volatile storage shown in FIG. 1.
Figure 15B:
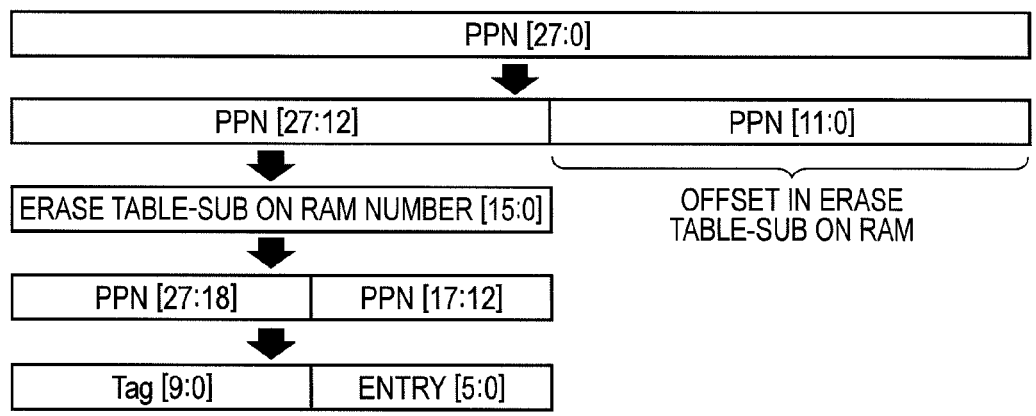
Figure 15C:
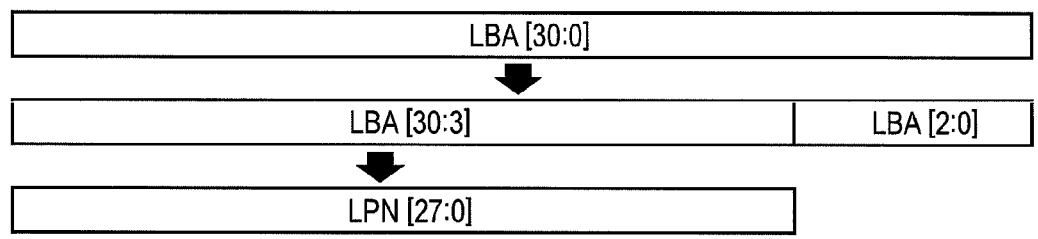

The area table will be explained in more detail using FIG. 14 and FIG. 15. FIG. 14 is a diagram for explaining the area table. FIGS. 15A to 15C are diagrams for explaining the logical address and the physical address.

How to find out the physical address of the data specified by the host device 201 will be described. Addressing using the logical address LBA specified by the host device 201 is performed in units of 512 bytes, as described above. Considering the SSD 202 of 1-TB capacity, it is understood that its address width becomes 31 bits from the following Formula (6).

$$1 \text{ TB}/512 \text{ B}=2^{31} \tag{6}$$

The addressing is explained taking a case where the data size required by the host device 201 is 512 bytes as an example. First, an address translation table-sub on RAM number is found by using a fact that the LBA[30:13] (i.e., upper 18 bits of the LBA address, see FIG. 15) represents the address translation table-sub on RAM number. As shown in FIG. 15, further, the tag and the entry in the address translation table cache LPT-C are found. The tag is LBA[30:19] (i.e., upper 12 bits of the LBA address), and the entry is LBA[18:13]. By putting the tag of the obtained entry into comparison, the cache hit determination of the address translation table cache LPT-C is performed.

When the cache miss occurs, next, using facts that the physical address of the address translation table-sub on RAM recorded in the area table is in units of four bytes and that data is recorded in an order of the address translation table-sub on RAM number from a start address of the RAM 206, the physical address of the address translation table-sub on RAM is obtained from the area table by designating an address obtained by multiplying the address translation table-sub on RAM number by four as a start address at which data is read from the RAM 206 and reading the data of 4 Kbytes in size. The obtained physical address is designated as a start address at which data is read from the NVM 205, and the data of 4 KB in size is copied to the RAM 206.

The physical address of the data area is obtained by multiplying LBA[12:3] by four to get an amount, offsetting an address of a copy destination of the RAM 206 by that amount to find out the start address, and reading thereat four bytes. Since the data management size is 4 KB, the size of the data indicated by this physical address is 4 KB.

Next, an address obtained by offsetting a head address of the data area indicated by this physical address by a value of LBA[2:1] (i.e., lower three bits of the LBA address) multiplied by 512 is designated as a start address, and data of 512 bytes in size is read from the NVM 205. Finally, the read data of 512 bytes is sent to the host device 201.

By going through the above process, the data specified by the host device 201 can be read from the SSD 202.

As described in FIG. 14, one address translation table-sub on RAM has address translation information of a sector area of 8 K of the LBA. Moreover, the logical address LPN is upper 28 bits of the LBA address as described in FIG. 15.

Next, how to find out erase information of the physical address PPN is described. The data management size shall be in units of 4 KB as described above. Considering the SSD 202 of 1-TB capacity, it is understood that the address width becomes 28 bits from the following Formula (7).

$$1 \text{ TB}/4 \text{ KB} = 2^{28} \quad (7)$$

First, PPN[27:12] (i.e., upper 16 bits of the LBA address, see FIG. 15) becomes an erase table-sub on RAM number. By designating an address obtained by offsetting a head address (in this example, 1024 KB) of the area in which the physical address of the erase table-sub on RAM is stored by an amount of fourfold the erase table number as a start address, and reading data of four bytes in size at this address from the RAM 206, the physical address of the erase table-sub on RAM can be obtained. The obtained physical address is designated as a start address at which data is read from the NVM 205, and the data of 4 KB in size is copied to the RAM 206.

The erase information of the PPN is obtained by designating an address obtained by offsetting the address of the copy destination of the RAM 206 by an address of LBA[11:0] as a start address, and reading one-byte data at that address.

If the PPN is unerasable as a result of checking the erase information, the PPN is the newest data and may be read from the host device 201 after this. Therefore, it is data that cannot be erased in the garbage collection. If it is erasable, it is not the newest data, that is, the newest data exists in an other physical page of the NVM 205, and it is data that will not be read from the host device 201 after this. Therefore, it is understood that it is data that may be erased in the garbage collection.

As described in FIG. 14, one erase table-sub on RAM has the erase information of 4-K PPNs.

Moreover, as described in FIG. 15, upper 10 bits of the erase table-sub on RAM number, namely PPN[27:18], becomes its tag, and PPN[17:12] becomes its entry. Moreover, LBA[30:0], namely upper 28 bits of the LBA address, become the logical address LPN. Here, a bit width used for the explanation is one example for facilitating the explanation after all, and it goes without saying that it is changed according to the cache size and the capacity of the SSD 202 in fact.

<Effect of First Embodiment>

According to the first embodiment explained above, by having the NVM 205, the RAM 206, the control unit 204, etc., typically, the SSD 202 that has a reduced manufacturing cost, has high access performance and reliability, and is space saving can be manufactured. Stating in detail, the following effects can be achieved.

(1) The control unit 204 can store in the NVM 205 the address translation table LPT for translating the logical address given in order to access the NVM 205 after dividing it into multiple tables, and can store in the RAM 206 multiple sets of the address translation tables-sub on RAM (LPT-SRs) that have been divided into multiple tables.

(2) The control unit 204 can perform the cache control of the address translation table-sub on RAM (LPT-SR) stored in the RAM 206. As this method of cache control, entries to be searched based on the logical address can be limited. Moreover, the cache that is to be discarded can be determined based on an access frequency. Furthermore, a data size when writing back the address translation table-sub on RAM (LPT-SR) updated in the cache control to the NVM 205 can be made larger than that of the address translation table-sub on RAM (LPT-SR).

(3) The control unit 204 stores in the NVM 205 the address translation table LPT for translating the logical address of the data of the NVM 205 to the physical address, further stores in the RAM 206 the address translation table cache LPT-C of the address translation table LPT and the area table 207 for showing where in the NVM 205 the address translation table LPT is stored, and further stores in the area table 207 multiple addresses of the address translation table LPT in the NVM 205.

(4) The control unit 204 can perform the wear leveling of the address translation table LPT using the area table 207.

(5) The control unit 204 can store in the NVM 205 the erase table ET for showing whether the data stored in the NVM 205 is erasable after dividing it into multiple tables, and can store in the RAM 206 multiple sets of the erase tables-sub on RAM (ET-SRs) that have been divided into multiple tables.

(6) The control unit 204 can store simultaneously in the NVM 205 the erase table-sub on RAM (ET-SR) stored in the RAM 206.

Second Embodiment

Figure 16:
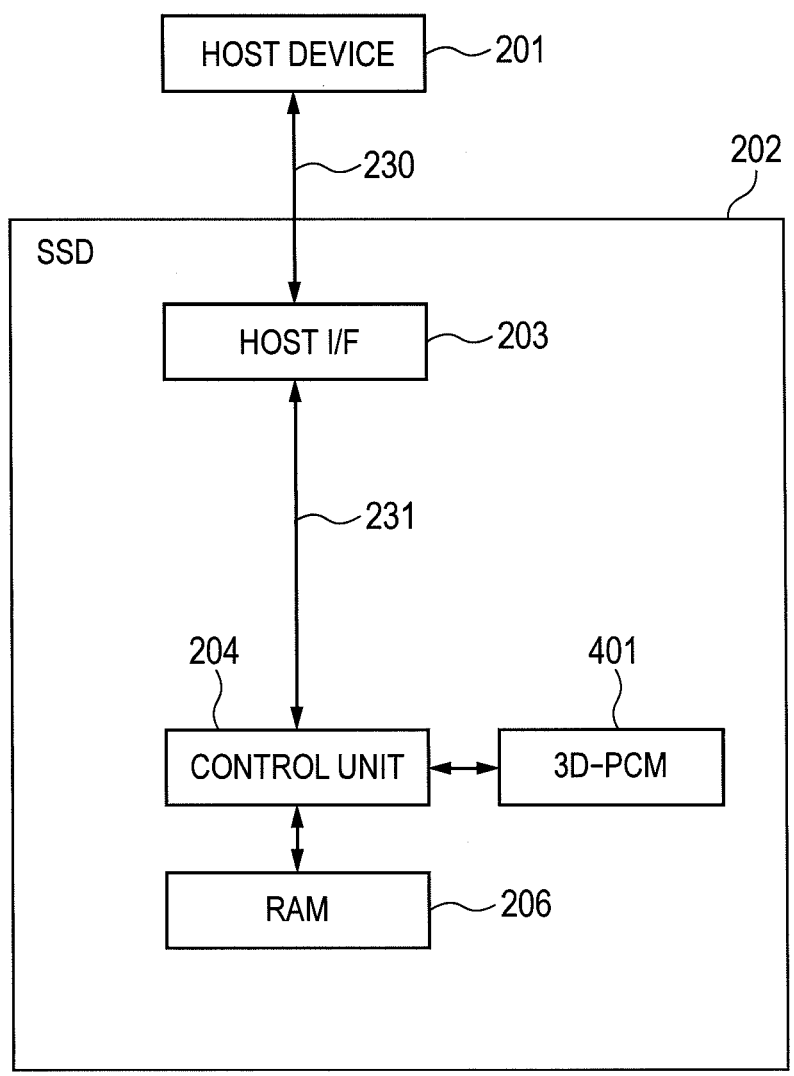
FIG. 16 is a diagram showing one example configuration of a non-volatile storage that is a second embodiment of the present invention.
Figure 17:
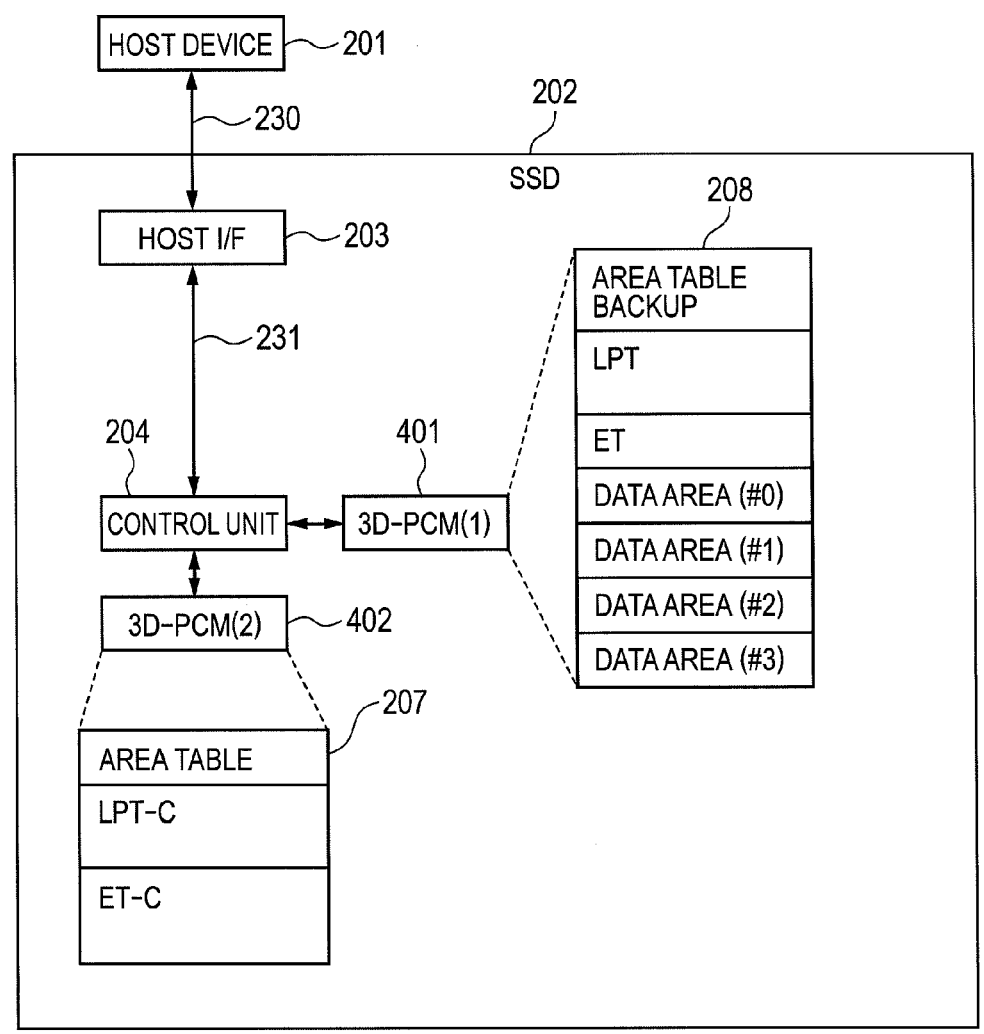
FIG. 17 is a diagram showing a modification of the configuration of the non-volatile storage in the non-volatile storage shown in FIG. 16.

A non-volatile storage of a second embodiment will be explained using FIG. 16 and FIG. 17. FIG. 16 is a diagram showing one example configuration of this non-volatile storage (SSD) 202. FIG. 17 is a diagram of a modification configuration of the SSD 202.

In this embodiment, an example of the SSD 202 that not only has a reduced mounting cost of the volatile memory and high access performance but also has higher access performance than the above-mentioned first embodiment will be explained.

The phase change memory is used as the non-volatile memory (NVM). Especially, it is desirable to use three-dimensional stacked phase change memory 3D-PCM (3 Dimension Phase Change Memory) that has a large capacity is used.

A configuration of the SSD 202 in the second embodiment will be explained using FIG. 16. Explanations are omitted for configurations to which the same symbols shown in FIG. 1 and explained in the first embodiment already described above are given and portions having the same functions in the SSD 202 shown in FIG. 16.

The SSD 202 of this embodiment is comprised of the host I/F 203, the internal bus 231, the control unit (the SSD controller) 204, three-dimensional stacked phase change memory (3D-PCM) 401, and the RAM 206. In this SSD 202, the host I/F 203 is connected with the host device 201 through the interface 230. A configuration in which the RAM 206 and the 3D-PCM 401 are integrated into one chip is also possible as described later.

In the phase change memory, storage information is written by making a crystalline state of a memory element change according to the Joule heat caused by a current flowing through the memory element itself. As a material of the memory element, chalcogenides are used. The chalcogenide is a material containing at least one element of sulfur, selenium, and tellurium.

An operation principle of the phase change memory will be explained briefly. When changing a phase change part to amorphous, a reset pulse that heats the phase change part to a temperature more than or equal to a melting point of the chalcogenide material and cools it rapidly is impressed. The melting point is 600° C., for example. A time to cool it rapidly is 2 ns, for example. When crystallizing the phase change part, a temperature of the phase change part is maintained at a crystallization temperature to the melting point locally. The temperature at this time is 400° C., for example. Although the time required for crystallization is different depending on a composition of the chalcogenide material, it is 50 ns, for example. Hereafter, crystallizing the phase change part of the phase change memory is called a set operation, and changing it to amorphous is called a reset operation.

The feature of the phase change memory is that since a resistance value of the phase change part varies by two-digit or three-digit according to a crystalline state and this resistance value is used as a signal, a reading signal is large and a sensing operation becomes easy; therefore, the reading is performed at high speed.

Furthermore, since the 3D-PCM 401 is such that memory elements are stacked not only in a plane direction but also in a height direction, 3D-PCM 401 has a large capacity and is suitable for a usage of the SSD 202.

By using the 3D-PCM 401 as the NVM, a large-capacity SSD 202 whose access speed is high can be provided.

Furthermore, in order to make the most of a feature of the 3D-PCM 401 that its access speed is fast, it is desirable not only to perform the cache control of the address translation table and the erase table, but also to improve the hit ratio of the cache by enlarging a ratio of a data size of the cache to the NVM (in this embodiment, the 3D-PCM). For example, although the data size of the address translation table cache was 64 MB to an SSD capacity of 1 TB in the first embodiment described above, it is possible to enlarge this to 256 MB. Similarly, the size of erase table cache can also be enlarged.

Moreover, in the case of this embodiment using the phase change memory as the NVM, it is also possible to adopt a configuration as shown in FIG. 17. That is, the SSD 202 shown in FIG. 17 can use phase change memory (3D-PCM (2)) 402 that has a configuration different from that of the phase change memory (3D-PCM(1)) 401 of the NVM and is configured to have higher accessibility as a storing place of the address translation table cache LPT-C. In this case, the 3D-PCM 401 and the 3D-PCM 402 can also be integrated in the same chip. Since the number of chips that form the SSD decreases, this case brings an advantage that the cost can be reduced. Incidentally, it goes without saying that it is possible to mount two or more chips each having the 3D-PCM 401 and the 3D-PCM 402 in the SSD according to the required performance. Here, the "chip" refers to one of chips that were cut out from a sheet of a semiconductor substrate on which circuit elements are formed.

As shown in FIG. 17, the phase change memory has two areas: an area capable of being accessed at high speed; and an area of a still larger capacity through it can be accessed only at a lower speed than the above area. Pieces of information corresponding to the RAM of this embodiment (the address translation table cache, the erase table cache ET-C, and the area table) are written in the area (the 3D-PCM 402) capable of being accessed at a higher speed, and pieces of information corresponding to the NVM of this embodiment (the area table backup, the address translation table LPT, the erase table ET, and the data) are written in the area (the 3D-PCM 401) of a larger capacity. In this case, since the number of chips required for the NVM and the RAM can be reduced, it becomes possible to provide the SSD 202 of high cost competitiveness.

According to the second embodiment explained above, by using the phase change memory, it is possible to manufacture the SSD 202 that has higher access performance, a large capacity, and enhanced cost competitiveness, in addition to the effects of the first embodiment described above.

Third Embodiment

A non-volatile storage of a third embodiment will be explained with reference to FIG. 1 shown in the first embodiment described above.

In this embodiment, an example of the SSD 202 that not only has a reduced mounting cost of the volatile memory and has high access performance, but also reduces a capacity of the RAM 206 further and has high reliability will be explained.

Explaining the SSD 202 of this embodiment with reference to FIG. 1, the SSD 202 is characterized in that a valid flag and a dirty flag do not exist in the address translation table cache LPT-C on the RAM 206.

Since it operates with a simple control system, there are few possibilities that design mistakes (bugs) may incorporate into a development of the control unit (the SSD controller) 204 and it is possible to develop the high-reliability SSD 202 in a short time.

As an algorithm of the cache control, a full associative system can be used. Its entry is unity and the determination of the cache hit is performed on all the address translation tables-sub on RAM (LPT-SRs). Naturally, if a cache with an equal tag is found and a processing goes into the determination of the cache hit, it is not necessary to search remaining address translation tables-sub on RAM (LPT-SRs).

At the time of power supply on of the SSD 202, part of the address translation table is copied to the address translation table cache LPT-C in advance. A head part of the address translation table can be copied. Alternatively, the address translation table cache LPT-C may be restored to the state thereof at the time of power supply off. By always maintaining information in the address translation table cache LPT-C to be valid (effective), a control method that does not need the valid flag is realizable.

The address translation table-sub on RAM (LPT-SR) updated by the write instruction from the host device 201 is written back to the address translation table LPT of the NVM 205 before a next access to the address translation table cache LPT-C arises. This operation controls so that information of the address translation table LPT and that of the address translation table cache LPT-C may always coincide with each other. When the address translation table cache LPT-C is evicted, any access to the address translation table cache LPT-C is suspended during a period from eviction start (when data copy of the NVM 205 to the RAM 206 of the address translation table-sub on RAM (LPT-S) begins) to eviction end (when the operation completes).

The above-mentioned control method makes it possible to realize the SSD 202 that does not need the valid flag and the dirty flag of the address translation table cache LPT-C.

According to the third embodiment explained above, it is possible to reduce the capacity of the RAM 206 further and to manufacture the SSD 202 of high reliability in addition to the effects of the first embodiment described above by a fact that neither the valid flag nor the dirty flag exist in the address translation table cache LPT-C on the RAM 206.

Fourth Embodiment

Figure 18:
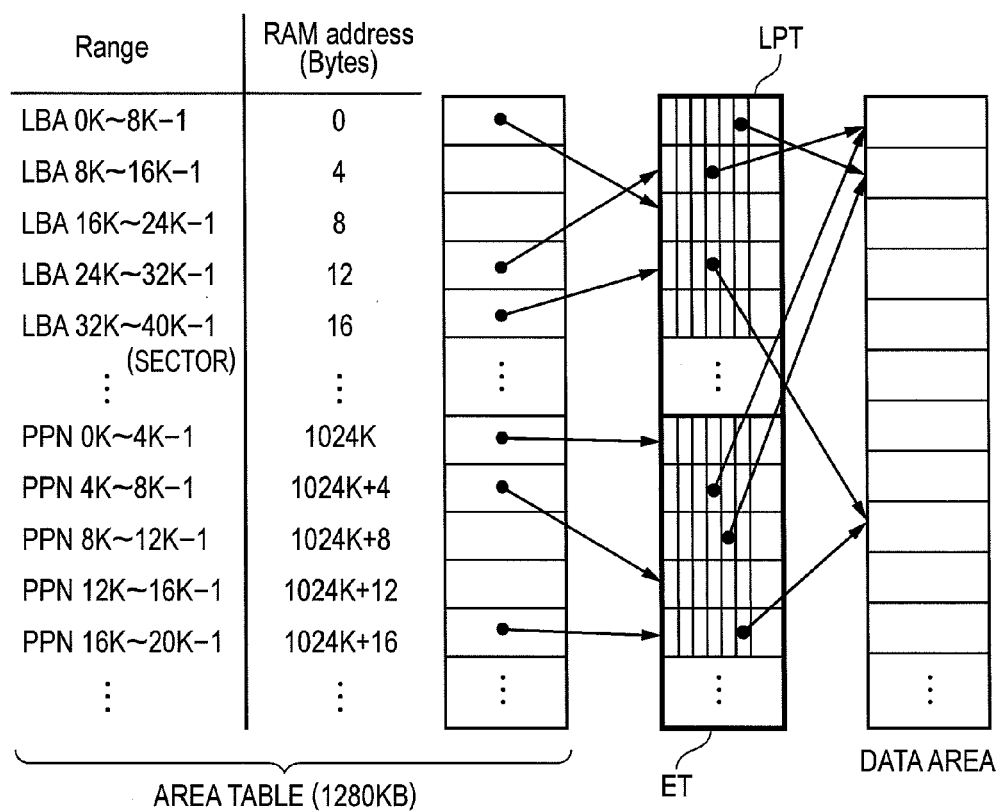
FIG. 18 is a diagram for explaining the area table in the non-volatile storage that is a fourth embodiment of the present invention.

A non-volatile storage of a fourth embodiment will be explained using FIG. 18. FIG. 18 is a diagram for explaining the area table of this non-volatile storage (SSD) 202.

In this embodiment, the non-volatile storage is characterized in that the wear leveling of the address translation table LPT and the erase table ET are performed by the area table. Since the writing of the address translation table LPT and the erase table ET to the NVM 205 is leveled by the area table, the high-reliability SSD 202 is realizable.

FIG. 18 shows a relationship among the area table, the address translation table LPT, the erase table ET, and the data area. The area table stores the physical addresses of the address translation table LPT-S and the erase table ET-S. The address translation table-sub on RAM number can be determined from a partial address (e.g., upper bits) of the LBA address. Moreover, the erase table-sub on RAM number can be determined from a partial address (e.g., upper bits) of the physical address PPN. The information contained in the address translation table-sub on RAM enables to determine where in the data area on the NVM 205 the data requested from the host device 201 is written. Moreover, the information contained in the erase table-sub on RAM enables to determine whether data written in the data area corresponding to the PPN is erasable.

Incidentally, it goes without saying that it is not necessarily required to perform the wear leveling of the address translation table LPT and the erase table ET simultaneously, and it is possible to perform the wear leveling only on the erase table ET using the area table.

Furthermore, regarding the erase table-sub on RAM (ET-SR) on the cache, multiple ET-SRs can be simultaneously written back to the NVM 205. Since the writing unit to the NVM 205 can be enlarged by doing in this way, the NVM 205 of a large page size can be efficiently controlled. Moreover, since it becomes unnecessary to perform a parallel control of multiple NVM chips skillfully, it becomes possible to realize a high-performance SSD 202 by a simple and robust control algorithm.

According to the fourth embodiment explained above, it is possible to manufacture the SSD 202 of high reliability and high performance in addition to the effect of the first embodiment described above because the address translation table LPT and the erase table ET are wear-leveled by the area table.

In the above, although the invention made by the present inventors was concretely explained based on the embodiments, it goes without saying that the present invention is not limited to the embodiments and can be modified variously within a range that does not deviate from the gist.

The SSD of the present invention relates to the SSD that has writable NVM, for example, flash memory or phase change memory, and its configuration can be used for the SSD containing the SSD controller for managing the writing or reading.

What is claimed is:

1. A non-volatile storage, comprising:
   first memory of non-volatile type;
   second memory having an access speed that is faster than the first memory; and
   a control unit for controlling accesses to the first memory and to the second memory;
   wherein the control unit stores, in the first memory, an address table for translating a logical address of data of the first memory to a physical address, the address translation table including a plurality of address translation subtables,
   wherein the control unit stores, in the second memory, a cache of the address translation table, and an address table including a physical address for each address translation subtable stored in the first memory,
   wherein a renewed range of the cache is rewritten to the first memory using a data size of N*2* a physical page size of the first memory, where N is an integer,
   wherein modifying the range of the cache modifies the size of the address translation table,
   wherein a larger cache range creates a larger address translation table,
   wherein a smaller cache range creates a smaller address translation table, and
   wherein the physical page size of the first memory is larger than a size of the address translation subtable.

2. In The non-volatile storage according to claim 1, wherein the second memory is Dynamic Random Access Memory.

3. The non-volatile storage according to claim 1, wherein the control unit performs wear leveling of the address translation table using the address table.

4. The non-volatile storage according to claim 1, wherein each address translation subtable includes a plurality of physical addresses.

5. The non-volatile storage according to claim 1, wherein, when the control unit performs a rewrite operation on first data:
   second data is added to the first data,
   the first and second data are written to the first memory, and
   the cache of the address translation table is updated, and
   wherein a data management size of the rewrite operation is N*2* the physical page size of the first memory.

6. The non-volatile storage according to claim 5, wherein the second data is read from the first memory before being added to the first data.

* * * * *